(12) United States Patent
Churchill

(10) Patent No.: US 12,041,102 B2
(45) Date of Patent: Jul. 16, 2024

(54) VIDEO CONFERENCE ENHANCEMENTS FOR EDUCATION

(71) Applicant: Kristina Ann Churchill, Grand Ledge, MI (US)

(72) Inventor: Kristina Ann Churchill, Grand Ledge, MI (US)

( * ) Notice: Subject to any disclaimer, the term of this patent is extended or adjusted under 35 U.S.C. 154(b) by 196 days.

(21) Appl. No.: 17/339,441

(22) Filed: Jun. 4, 2021

(65) Prior Publication Data

US 2021/0385263 A1 Dec. 9, 2021

Related U.S. Application Data

(60) Provisional application No. 63/035,825, filed on Jun. 8, 2020.

(51) Int. Cl.
| | |
|---|---|
| *H04L 65/401* | (2022.01) |
| *G06F 3/0482* | (2013.01) |
| *H04L 12/18* | (2006.01) |
| *H04L 65/1069* | (2022.01) |
| *H04L 65/4038* | (2022.01) |
| *G09B 5/06* | (2006.01) |

(52) U.S. Cl.
CPC ........ *H04L 65/4038* (2013.01); *G06F 3/0482* (2013.01); *H04L 12/1822* (2013.01); *H04L 65/1069* (2013.01); *H04L 65/4015* (2013.01); *G09B 5/065* (2013.01)

(58) Field of Classification Search
CPC ............. H04L 12/1822; H04L 65/1069; H04L 65/4015; H04L 65/403
See application file for complete search history.

(56) References Cited

U.S. PATENT DOCUMENTS

| | | | |
|---|---|---|---|
| 6,381,444 B1 * | 4/2002 | Aggarwal | G09B 5/02 434/350 |
| 7,478,129 B1 | 1/2009 | Chemtob | |
| 9,111,459 B2 | 8/2015 | Robbins et al. | |
| 9,578,073 B2 | 2/2017 | Bader-Natal et al. | |
| 10,264,037 B2 | 4/2019 | Ellbogen et al. | |
| 2007/0299710 A1 | 12/2007 | Haveliwala | |

(Continued)

OTHER PUBLICATIONS

4 New Zoom Features Educators Can Use to Enhance Virtual Teaching and Learning, Dated Sep. 21, 2020 6 Pages.

(Continued)

*Primary Examiner* — Lesa M Kennedy
(74) *Attorney, Agent, or Firm* — FOLEY & LARDNER LLP

(57) ABSTRACT

A virtual conferencing system is described for implementing a plurality of user interface configurations for an administrator and for a plurality of users to access via computing devices. The virtual conferencing system includes a user interface configuration for an administrator to place users in a specific location within a virtual environment and provide users with visual and audio feedback. The virtual conferencing system also includes a virtual breakout room configuration for the administrator to distribute a subset of users into breakout rooms and access each breakout room simultaneously. The virtual conferencing system also includes a virtual waiting room configuration for the administrator to place users within a waiting room including an audio and visual element for any desired amount of time.

14 Claims, 17 Drawing Sheets

(56) References Cited

U.S. PATENT DOCUMENTS

| | | | |
|---|---|---|---|
| 2012/0226997 A1* | 9/2012 | Pang | H04L 12/1818 |
| | | | 715/753 |
| 2014/0068463 A1* | 3/2014 | Kay | H04L 12/1822 |
| | | | 715/753 |
| 2014/0267550 A1* | 9/2014 | Nimri | H04N 7/152 |
| | | | 348/14.09 |
| 2015/0312520 A1 | 10/2015 | Nohria et al. | |
| 2019/0220335 A1* | 7/2019 | Pather | G06F 9/547 |
| 2020/0219216 A1* | 7/2020 | Davis | H04L 12/1822 |

OTHER PUBLICATIONS

How To Play Music Over Your Live Stream on Zoom, 8 Pages.
Mark Sparvell, "New Features in Teams and Onenote Support Social Emotional Learning Approaches" Dated Sep. 17, 2020 10 pages.
Matt Wade "How To Use Breakout Rooms in Microsoft Teams" dated Sep. 26, 2020 13 Pages.
Microsoft Teams for Education, "Notify the Entire Class and Post Announcements in Microsoft Teams" 4 Pages.
Office Support "Share Sound From Your Computer in a Teams Meeting or Live Event" 4 pages.
Suzanne Labarre; "Zoom is Failing Teachers. Here's How They Would Redesign It" Dated Sep. 3, 2020 14 pages.

* cited by examiner

VIDEO CONFERENCE ENHANCEMENTS FOR EDUCATION

CROSS-REFERENCE TO RELATED PATENT APPLICATIONS

This application claims the benefit of and priority to U.S. Provisional Application No. 63/035,825, filed on Jun. 8, 2020, the entire disclosure of which is hereby incorporated by reference herein.

BACKGROUND

The present disclosure relates generally to video conferencing platforms. More specifically, the present disclosure relates to a system and method for managing virtual conferencing features.

Virtual conferencing platforms may refer to various forms of meetings, conferences, assemblies, or other collaborative environments in which participants may join online, or through other various electronic means. Virtual conferencing platforms can be used to support live audio and video streams of participants, typically through computing systems connected to a central server.

Virtual conferencing platforms for use in commercial or residential environments are typically limited in terms of structures and simulations to create a real-life feel. For example, a teacher hosting students in an online classroom setting may not have the capability of in-person classroom aids including assigned seating, student feedback, and facilitated group discussions.

Recognizing that there may be situations where it is desirable to allow similar capabilities discussed above into an online conferencing system, some manufacturers have incorporated technology that allows for some control of virtual conferencing features. For example, some virtual conferencing systems may use processors and controllers to facilitate display of a representation of a participant within the conferencing system based on a level of audio input from the participant.

In some cases, it may not be logical to create a setup based on participant's audio input. For example, if a video conference includes several participants, it may not be immediately clear which participants have joined the conference. Such systems may also have a limited feature set (e.g., no feedback, organization, etc.)

It would be advantageous to provide an improved virtual conferencing system that address one or more of the aforementioned issues.

SUMMARY

At least one embodiment relates to a system having a central computing system to provide a virtual environment to an administrator computing device and to a plurality of user computing devices that are each associated with a respective user. The central computing system includes one or more processors and memory storing instructions, which, when executed, cause the one or more processors to receive a user interface configuration from the administrator computing device. The configuration includes a location of a visual representation of each of the respective users to be displayed at the administrator computing device and the plurality of user computing devices. The instructions further cause the one or more processors to receive log-in credentials for a user to access the virtual environment and determine the location of the visual representation of the user within the interface based on the log-in credentials. The instructions cause the one or more processors to cause the administrator computing device and the plurality of user computing devices to render the user interface with the visual representation of the user.

Another embodiment relates to a method for receiving a user interface configuration from an administrator computing device for providing a virtual environment to the administrator computing device and to a plurality of user computing devices. The method includes receiving log-in credentials for a user to access the virtual environment. The method further includes determining, based on the log-in credentials, the location of the visual representation of the user within the user interface as provided by the administrator computing device. The method further includes causing the administrator computing device and the plurality of user computing devices to render the user interface with the visual representation of the user.

Another embodiment relates to a non-transitory computer readable medium storing instructions that causes a processor to perform operations. The operations include receiving a user interface configuration from an administrator computing device for providing a virtual environment to the administrator computing device and to a plurality of user computing devices. The operations include receiving log-in credentials for a user to access the virtual environment. The operations further include determining, based on the log-in credentials, the location of the visual representation of the user within the user interface as provided by the administrator computing device. The operations further include causing the administrator computing device and the plurality of user computing devices to render the user interface with the visual representation of the user.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
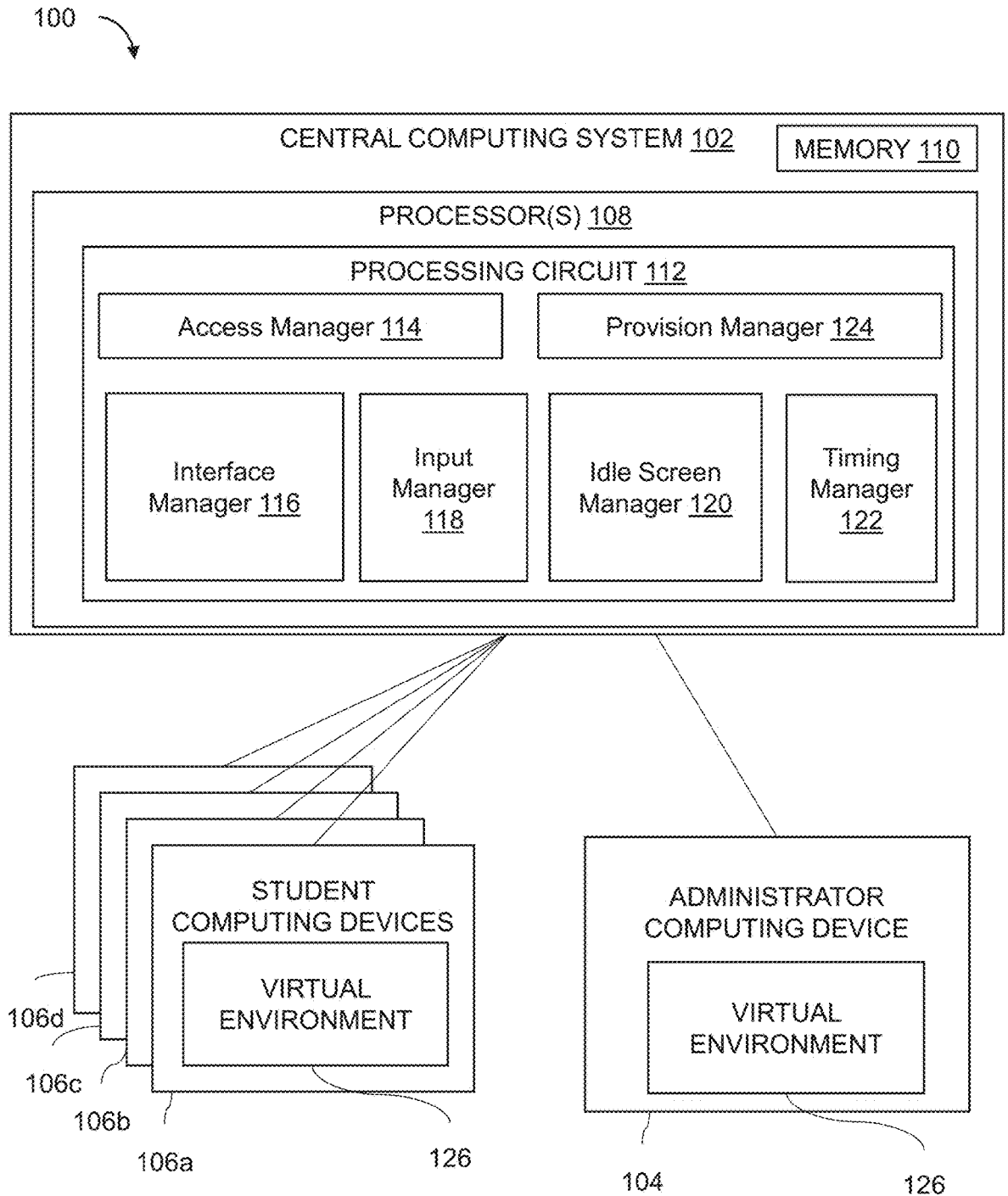
FIG. 1 is a schematic of an exemplary system in accordance with the present disclosure.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a system 100 and components thereof are shown according to an exemplary embodiment. The system 100 includes a central computing system 102 communicably coupled to a remote administrator computing device 104 and a plurality of student computing devices 106a-d (generally referred to herein as "student computing devices 106").

The computing system 102 includes a processor 108 and memory 110. Processor 108 may be a general purpose or specific purpose processor, an application specific integrated circuit (ASIC), one or more field programmable gate arrays (FPGAs), a group of processing components, or other suitable processing components. Processor 108 may be configured to execute computer code or instructions stored in memory 110 or received from other computer readable media (e.g., CDROM, network storage, a remote server, etc.) to perform one or more of the processes described herein. Memory 110 may include one or more data storage devices (e.g., memory units, memory devices, computer-readable storage media, etc.) configured to store data, computer code, executable instructions, or other forms of computer-readable information. Memory 110 may include random access memory (RAM), read-only memory (ROM), hard drive storage, temporary storage, non-volatile memory, flash memory, optical memory, or any other suitable memory for storing software objects and/or computer instructions. Memory 110 may include database components, object code components, script components, or any other type of information structure for supporting the various activities and information structures described in the present disclosure. Memory 110 may be communicably connected to processor 108 to form a processing circuit 112, and memory 110 may include computer code or other instructions for executing (e.g., by processor 108, etc.) one or more of the processes described herein.

The memory 110 is described below as including various circuits 112. While the exemplary embodiment shown in the figures shows each of the circuits 112 as being separate from one another, it should be understood that, in various other embodiments, the memory 110 may include more, less, or altogether different circuits 112. For example, the structures and functions of one circuit 112 may be performed by another circuit 112, or the structures and functions of two circuits 112 may be combined such that they are implemented and/or performed by only a signal circuit 112. Additionally, it should be understood that any of the functionalities described as being performed by a circuit 112 that is a part of the computing system 102 may also be performed by a separate hardware component having its own processors, network interfaces, etc.

Referring now to FIG. 1 and FIG. 3-12, the processing circuit 112 may include an access manager 114. The access manager 114 is any device, component, element, and/or hardware configured to provide a user access to a virtual environment 126. The processing circuit 112 may further include an interface manager 116, an input manager 118, and an idle screen manager 120. The interface manager 116 is any device, component, element, and/or hardware configured to provide a user with an interface displayed to the virtual environment 126. The input manager 118 is any device, component, element, and/or hardware configured to receive and provide input to or from a user. The idle screen manager 120 is any device, component, element, and/or hardware configured to provide a user with a waiting room interface including an audio/visual effect to the virtual environment 126. Furthermore, the processing circuit 112 may include a timing manager 122 and a provision manager 124. The timing manager 122 is any device, component, element, and/or hardware configured to manage the timing of any element displayed to the virtual environment 126. Furthermore, the processing circuit 112 may include a provision manager 124. The provision manager 124 is any device, component, element, and/or hardware configured to provide the virtual environment 126 to the administrator computing device 104 and the student computing device 106.

Figure 9:
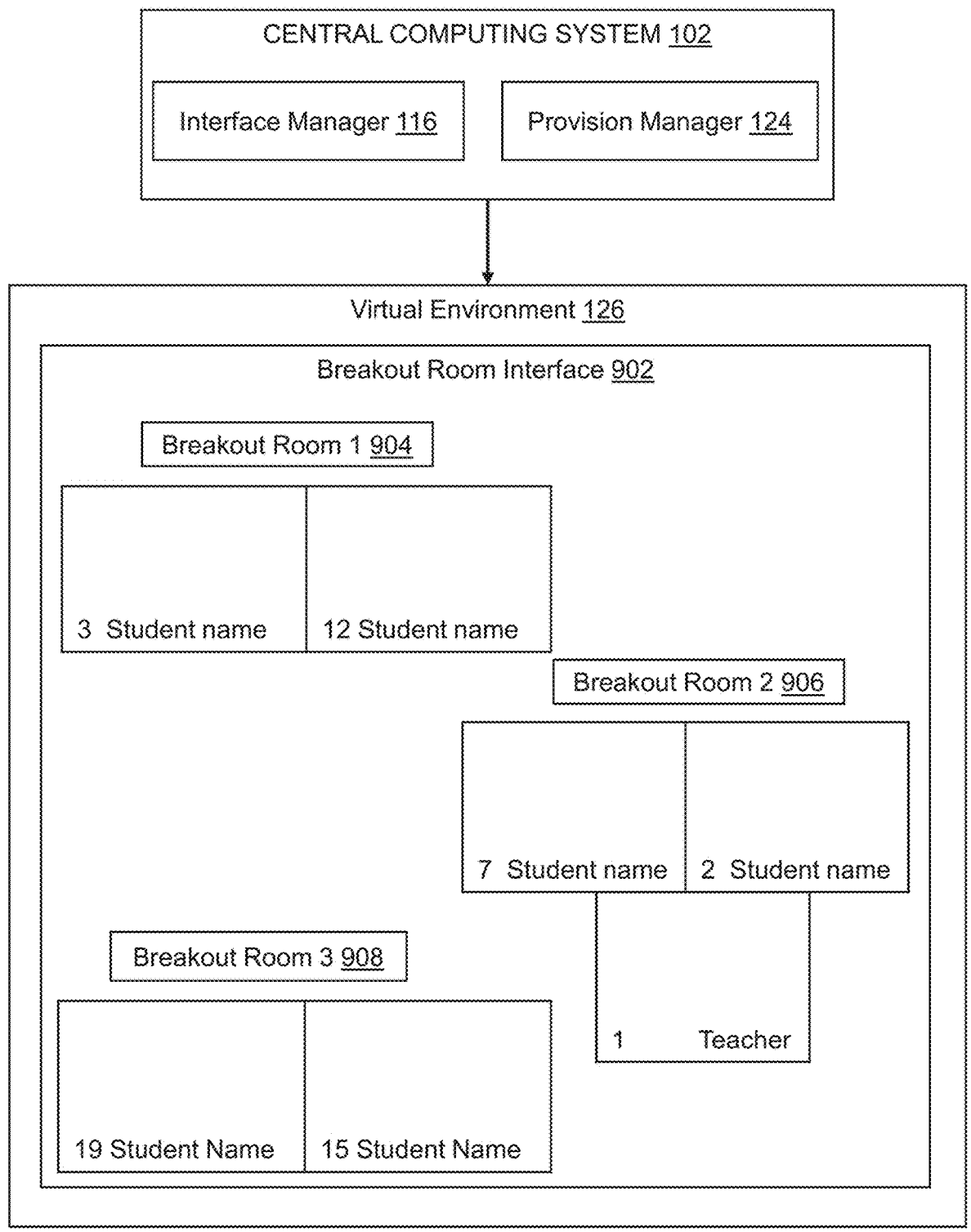
FIG. 9 is an illustration of a teacher's view when in a virtual breakout room interface in accordance with the present disclosure.
Figure 10:
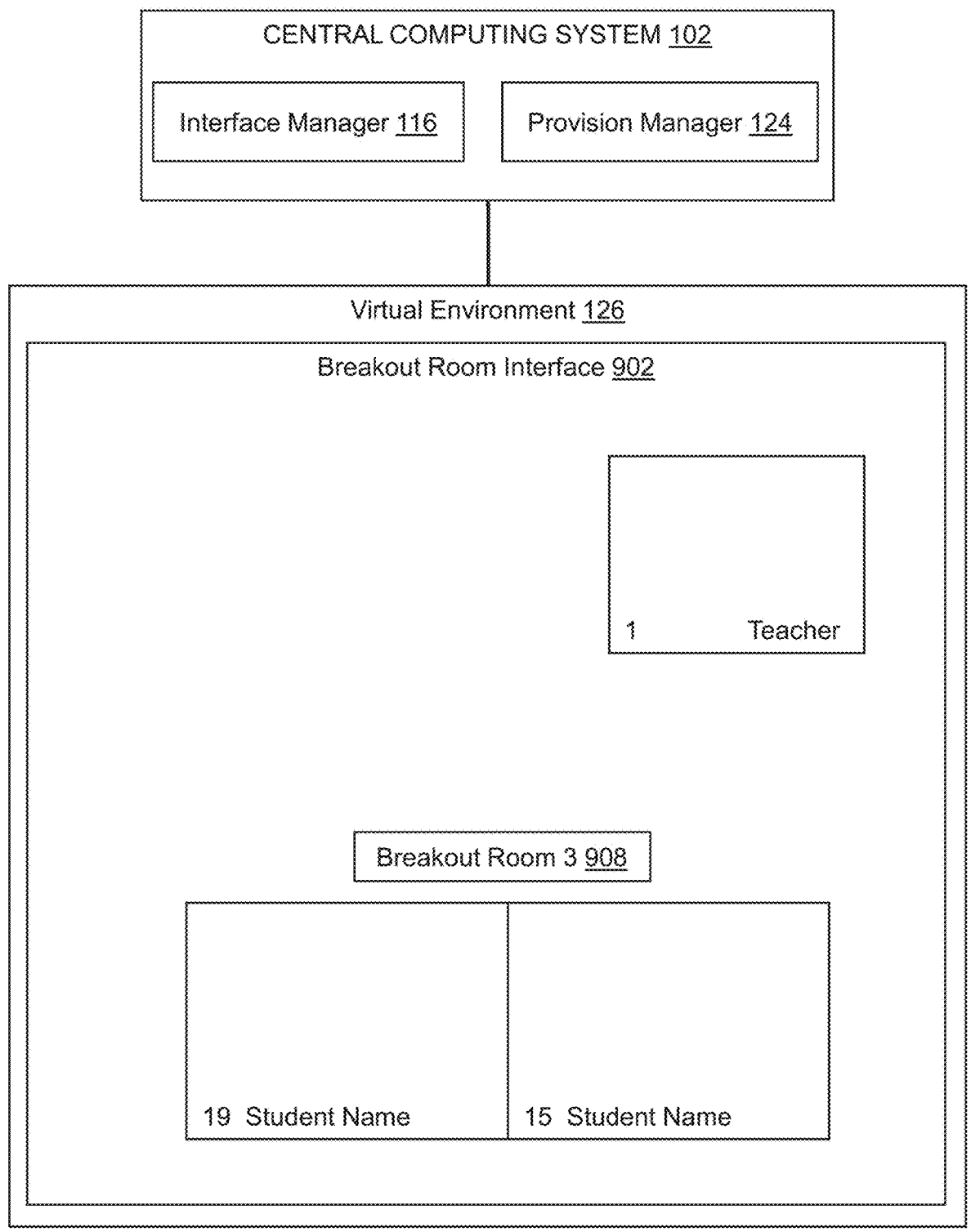
FIG. 10 is an illustration of a student's view of a virtual breakout room when the teacher is not within the room in accordance with the present disclosure.
Figure 11:
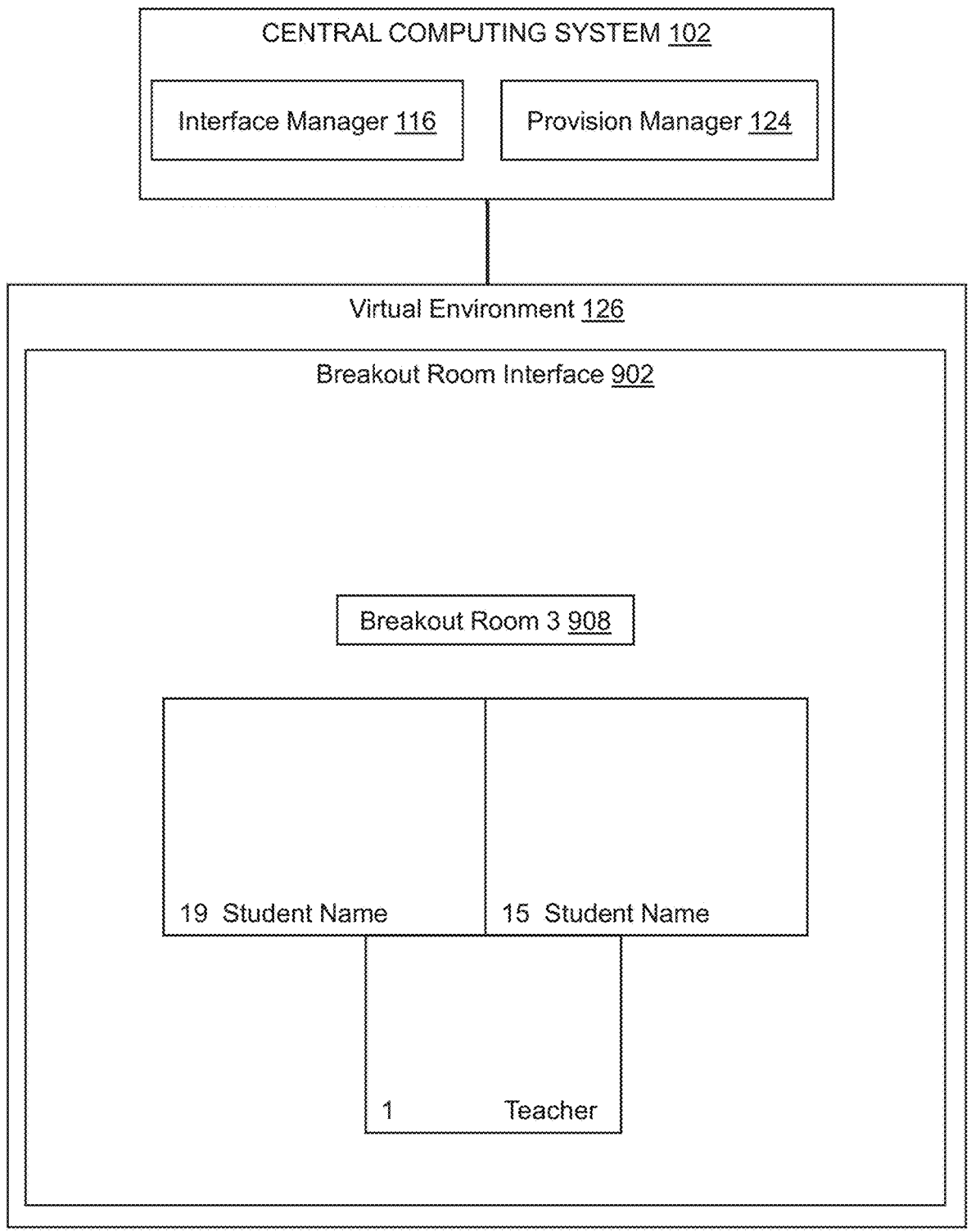
FIG. 11 is an illustration of a student's view of a virtual breakout room when the teacher is within the room in accordance with the present disclosure.
Figure 12:
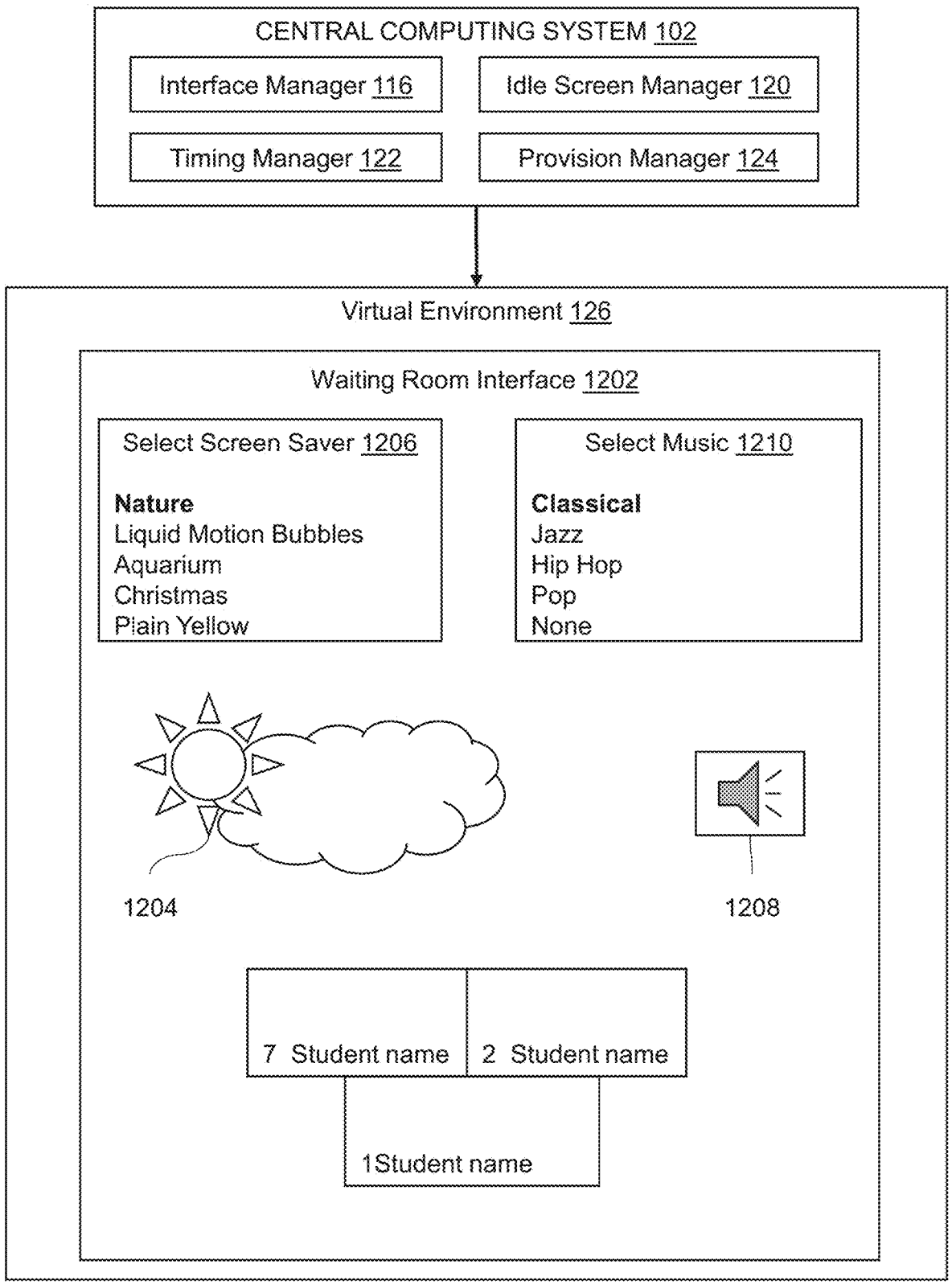
FIG. 12 is an illustration of a student's view of a virtual waiting room with a chosen screen saver and music option in accordance with the present disclosure.

The virtual environment 126 may include a collaborative conferencing platform in which users (e.g., students, patients, or other people) and administrators (e.g., teachers, professors, counselors, etc.) can interact. A user may access the virtual environment 126 through a student computing device 106 and an administrator may access the virtual environment 126 through an administrator computing device 104. Referring to FIG. 3-8, the virtual environment 126 may be presented as a "live classroom" including visual representations of users through a live stream, according to one exemplary embodiment. For example, the virtual environment 126 may simulate students "sitting" before an administrator, similar to an in-person classroom. Referring to FIG. 9-11, the virtual environment 126 may be presented as live virtual "breakout rooms," according to another exemplary embodiment. For example, the virtual environment 126 may simulate students "grouped" together for discussion, similar to in-person group discussions. Referring to FIG. 12, the virtual environment 126 may be presented as a virtual "waiting room," according to yet another exemplary embodiment. For example, the virtual environment 126 may simulate a space for students to "wait" to "enter" another virtual environment 126, similar to entering an in-person classroom space.

To facilitate organizing the virtual environment 126 and simulating the "feel" of an in-person classroom, an administrator may create and implement a virtual "seating chart." For instance, the administrator may create a virtual chart (e.g., map, plan, etc.) in which users (e.g., students, administrator, guests, etc.) are positioned at specific locations similar to students positioned at distinct spots (e.g., desks, chairs, etc.) within an in-person setting. The administrator may be able to create several virtual charts for various groups of users. The administrator may utilize the virtual seating chart to similarly position users at specified "locations" within a virtual meeting. For example, each user could be "shown" at a specific location (e.g., box, window, etc.) within the virtual environment 126 to simulate that of a room setting, as depicted in FIGS. 3-8. According to an exemplary embodiment, the administrator may incorporate the virtual seating chart into the central computing system 102 by assigning credentials (e.g., passwords) to each user and directing each user to a specified location within the virtual environment 126 based on the corresponding assigned credentials, as described in greater detail below.

Figure 2:
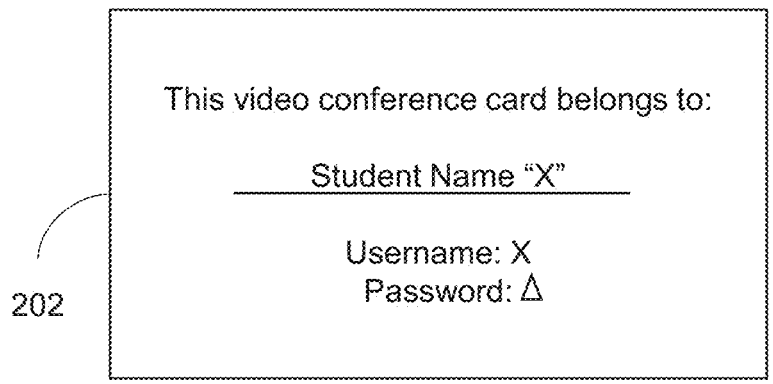
FIG. 2 is an illustration of student access cards in accordance with the present disclosure.
Figure 2:
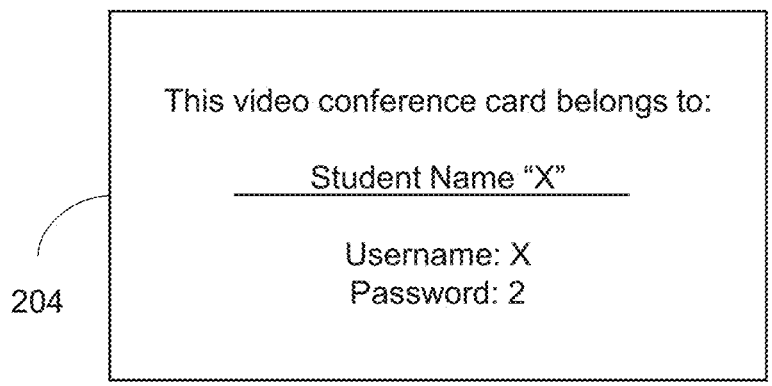
Figure 3:
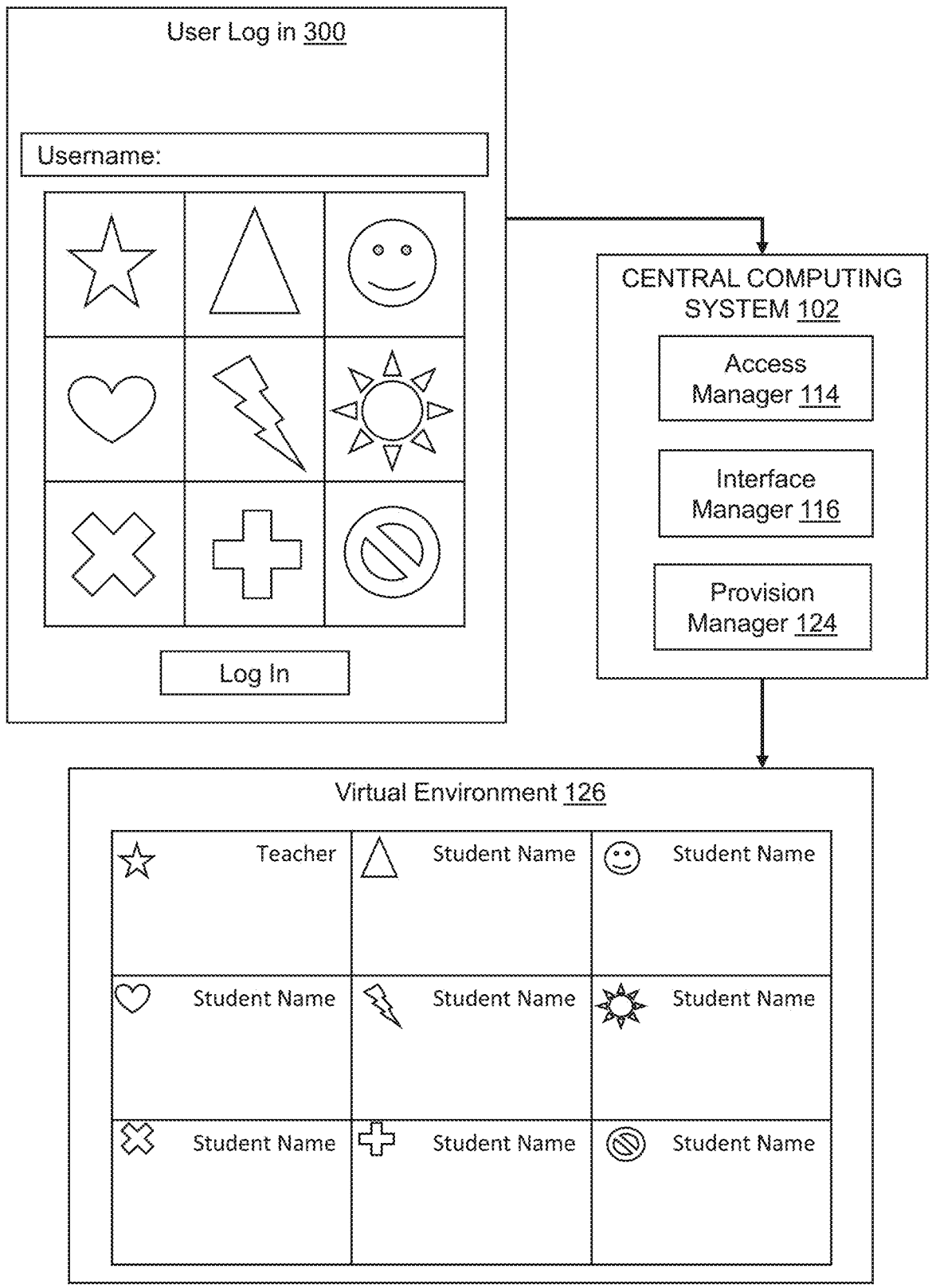
FIG. 3-4 are processes of example student log-in into a virtual environment in accordance with the present disclosure.

Referring to FIGS. 2 and 3, a user from a student computing device 106 may access the virtual environment 126 by means of an icon-based log-in window 300, according to one exemplary embodiment. Referring to FIG. 2, the user may receive log-in credentials from a provided student access card 202. For example, the administrator may distribute a student access card 202 to a student that includes a credential (e.g., password, code, etc.) specific to the student for granting access to the virtual environment 126. The central computing system 102 may be configured to generate a credential (e.g., password, code, etc.) randomly, as another example. Referring to FIG. 3, the user may provide the log-in credential when prompted with the log-in window 300. The access manager 114 may then be configured to provide the user access to the virtual environment 126 based on the log-in credential. Specifically, the access manager 114 may be configured to determine a location within the virtual environment 126 for the user to be directed based on the log-in credential corresponding with the location. The interface manager 116 may then be configured to provide a user interface configuration. The user interface configuration may include the user directed at a specified location within the virtual environment 126 based on the log-in credential. The provision manager 124 may then be configured to provision the virtual environment 126 to the student computing device 106 and the administrator computing device 104. The provision manager 124 may further be configured to provision each user within a specified location to the virtual environment 126 of each of the plurality of student computing devices 106, such that the virtual environment 126 is consistent for each user of the student computing devices 106. According to the exemplary embodiment shown in FIG. 3, the log-in credentials are in the shape of a plurality of icons. In other embodiments, the log-in credentials are different (e.g., colors, letters, etc.).

Figure 4:
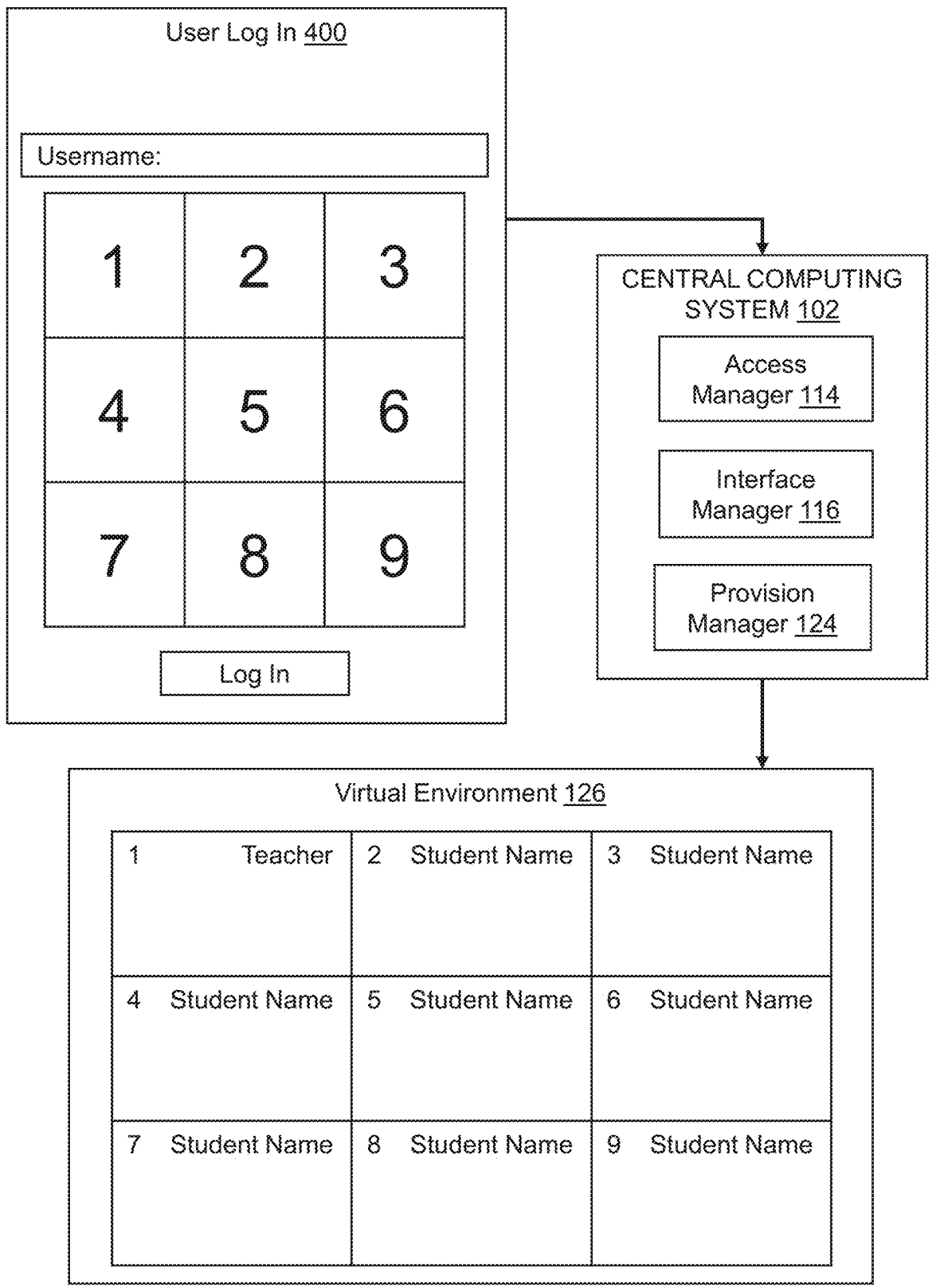

Referring to FIG. 2 and FIG. 4, a user from a student computing device 106 may access the virtual environment 126 by means of a numerical-based log-in window 400, according to one exemplary embodiment. Referring to FIG. 2, the user may receive log-in credentials from a provided student access card 204. For example, the administrator may distribute a student access card 202 to a student that includes a credential (e.g., password, code, etc.) specific to the student for granting access to the virtual environment 126. The central computing system 102 may be configured to generate a credential (e.g., password, code, etc.) randomly, as another example. Referring to FIG. 4, the user may provide the log-in credential when prompted with the log-in window 400. The access manager 114 may then be configured to provide the user access to the virtual environment 126 based on the log-in credential. Specifically, the access manager 114 may be configured to determine a location within the virtual environment 126 for the user to be directed based on the log-in credential corresponding with the location. The interface manager 116 may then be configured to provide a user interface configuration. The user interface configuration may include the user directed at a specified location within the virtual environment 126 based on the log-in credential. The provision manager 124 may then be configured to provision the virtual environment 126 to the student computing device 106 and the administrator computing device 104. The provision manager 124 may further be configured to provision each user within a specified location to the virtual environment 126 of each of the plurality of student computing devices 106, such that the virtual environment 126 is consistent for each user of the student computing devices 106. According to the exemplary embodiment shown in FIG. 4, the log-in credentials are a plurality of numbers. In other embodiments, the log-in credentials are different (e.g., colors, letters, etc.).

Once within the virtual environment 126 and positioned accordingly with the virtual seating chart, the administrator may be able to selectively "move" users around within the virtual environment 126. For example, the administrator may be able to "drag" a visual representation of a user of a student computing device 106 from one location and "drop" the visual representation of the user of the student computing device 106 at a different location. For example, the administrator computing device 104 may be configured to detect an input (e.g., click, drag, drop, etc.) from the administrator. The administrator computing device 104 may then be configured to send the input to the central computing system 102. The central computing system 102 may then be configured to update each of the user interfaces based on the input.

In some embodiments, the visual representations of the users of the student computing devices 106 may be fixed regardless of the corresponding users accessing the virtual environment 126. For example, the virtual seating chart may include spaces for the visual representations of each of the users of the student computing devices 106 and user of the administrator computing device 104. As each of the users access the virtual environment 126 via the respective device 104, 106, the visual representation of the users may be placed or positioned in the corresponding space of the virtual seating chart. As such, visual representations of users may be positioned within their corresponding (e.g., dedicated) space in the virtual seating chart whenever they "attend" (or access) the virtual space. Such implementations and embodiments provide for a consistent user interface including visual representations of the users which are accessing the virtual environment 126 regardless of the number of users which attend or access the virtual environment 126. For example, if a virtual seating chart includes spaces for 19 students and one administrator or teacher, the visual representations of each of the students and teachers may be located in the same location or space regardless of whether they access the virtual environment 126. Continuing this example, if 17 students and the administrator were to access the virtual environment 126, the visual representations of those students and administrator will be located at the same location within the user interface as if all 19 students and administrator accessed the virtual environment 126.

Within the virtual environment 126, the administrator and students may be able to perform a variety of tasks. For example, the administrator may provide visual and/or audio feedback (e.g., stickers, letters, icons, etc.) to the students. For example, the administrator computing device 104 may be configured to detect an input (e.g., click, drag, drop, etc.) from the administrator. The administrator computing device 104 may then be configured to send the input to the central computing system 102. The central computing system 102 may then be configured to update each of the user interfaces based on the input. The feedback may be directed towards a specific student or multiple students. For example, one student of the student computing devices 106 may receive feedback visible within the virtual environment 126 while another student of the student computing devices 106 may not "see" the feedback within the virtual environment 126. In other examples, all students of student computing devices 106 may receive and "see" the feedback within the virtual environment 126. The feedback may be "located" at a specific student's "space" (e.g., based on the seating chart). In some embodiments, the administrator and student computing devices 104, 106 may be configured to "upload" customized feedback including, but not limited to, pictures, drawings, icons, audios, and animations, to the central computing system 102. For example, the central computing system 102 may be configured to receive individualized feedback (e.g., stickers, tallies, sound effects, etc.) from the administrator computing device 104 to be used within the virtual environment 126. Similarly, the central computing system 102 may be configured to receive individualized feedback (e.g., stickers, tallies, sound effects, etc.) from a student computing device 106 to be used within the virtual environment 126, as another example.

Referring now to FIG. 5-8, a user from a student computing device 106 may receive feedback from the administrator computer device 104 in the form of stickers, timers, tallies, sound effects, or more. According to an exemplary embodiment referred to in FIG. 5, the administrator may input a sticker 504 from a sticker menu 502 into the virtual environment 126. For example, the provision manager 124 may be configured to display the sticker menu 502 to the virtual environment 126 of the administrator computing device 104. The administrator may interact with the sticker menu 502 in various ways. For example, the administrator may "select" (e.g., touch, click, etc.) the sticker 504 from the sticker menu 502. The administrator may apply the sticker 504 to a specific student or to all students within the virtual environment 126, as another example. When the sticker 504 is "selected" from the sticker menu 502 by the administrator, the input manager 118 is configured to receive the feedback. The interface manager 116 and the provision manager 124 may then be configured to display the sticker 504 within the user interface to the student computing devices 106 and the administrator computing device 104. For example, the administrator and students may be able to "see" the sticker 504 within the virtual environment 126.

Figure 5:
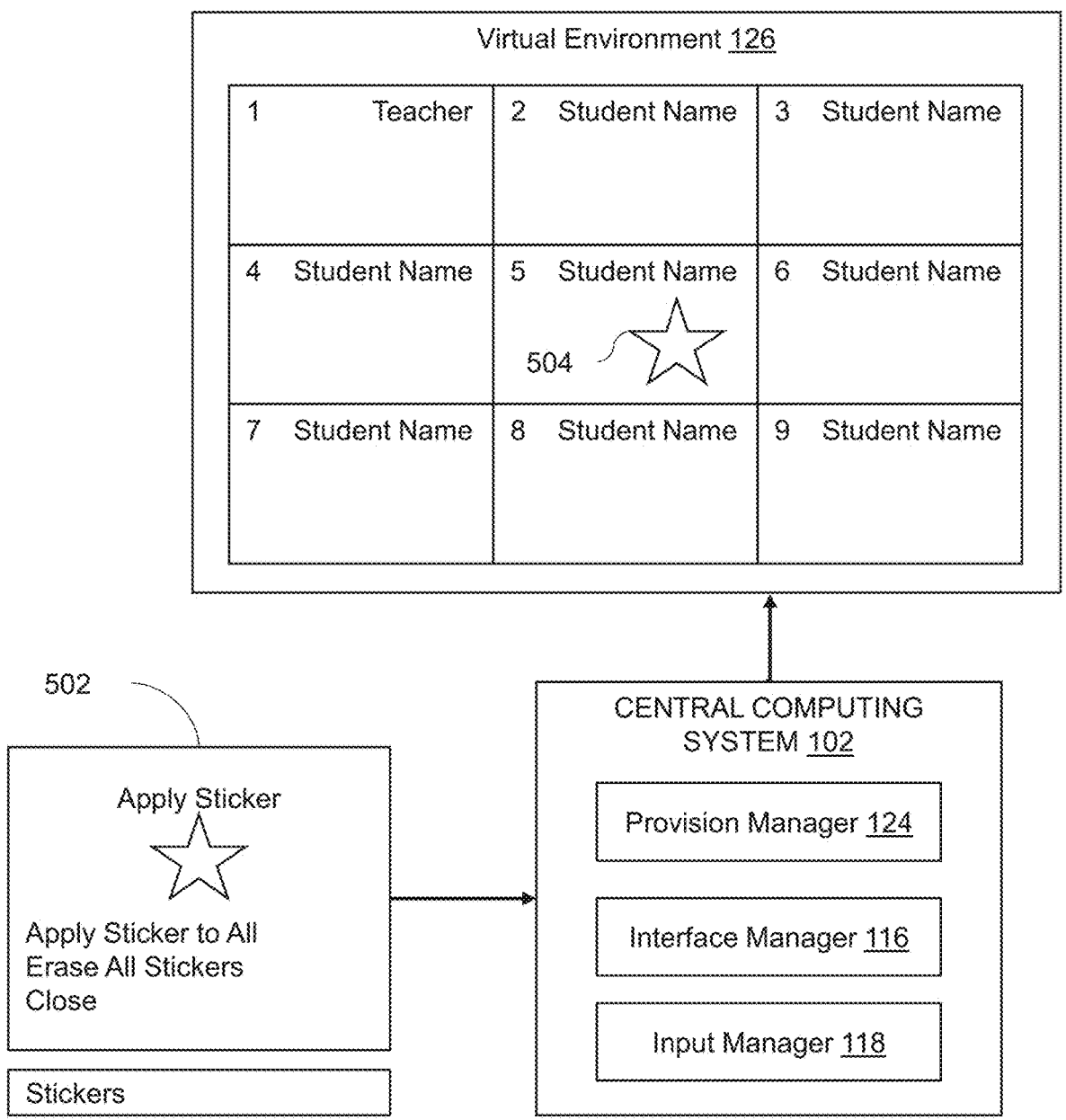
FIG. 5-8 are processes of example administrator input placed into a virtual environment in accordance with the present disclosure.

The administrator may apply the sticker 504 to the virtual environment 126 for a predetermined amount of time. For example, when the sticker 504 is "selected" from the sticker menu 502 by the administrator, the input manager 118 and the provision manager 124 may be configured to display the sticker 504 within the user interface to the student computing devices 106 and the administrator computing device 104 for a specified amount of time. The predetermined amount of time the sticker 504 is displayed can be determined through various ways. In some embodiments, the input manager 118 and the provision manager 124 may be configured to determine the amount of time based on a user input by the administrator via the administrator computing device 104, as one example. As another example, the amount of time can be randomly determined by the central computing system 102. While the sticker 504 depicted in the exemplary embodiment shown in FIG. 5 is in the general shape of a star, the sticker 504 can be various other shapes, sizes, or colors. For example, the stickers menu 502 may include a plurality of options of stickers (e.g., icons, pictures, etc.) from which the administrator may choose.

Figure 6:
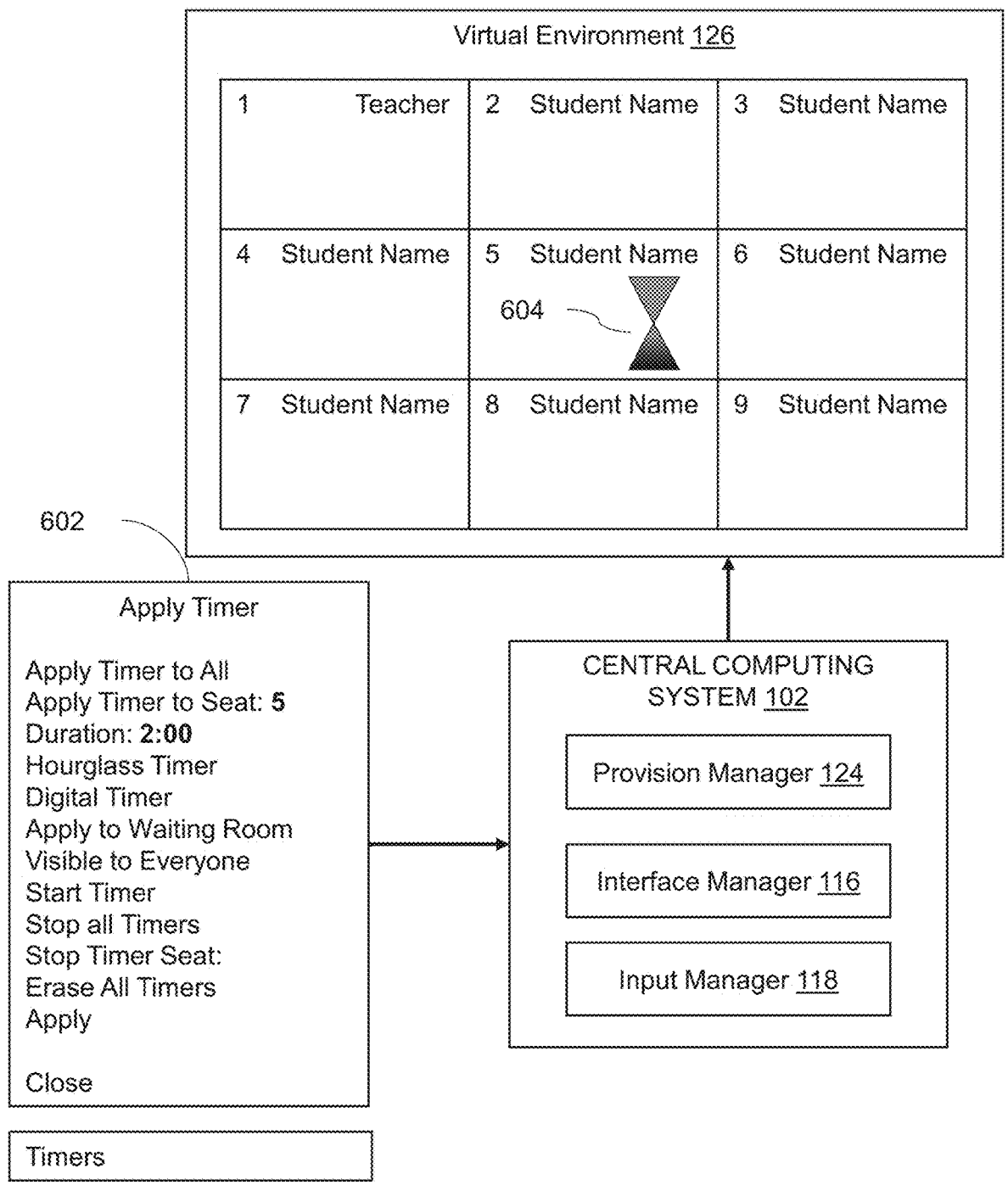

According to an exemplary embodiment referred to in FIG. 6, the administrator may input a timer 604 from a timers menu 602 into the virtual environment 126. For example, the provision manager 124 may be configured to display the timers menu 602 to the virtual environment 126 of the administrator computing device 104. The administrator may interact with the timers menu 602 in various ways. For example, the administrator may "select" (e.g., touch, click, etc.) the timer 604 from the timers menu 602. The administrator may apply the timer 604 to a specific student or to all students within the virtual environment 126, as another example. When the timer 604 is "selected" from the timers menu 602 by the administrator, the input manager 118 is configured to receive the feedback. The interface manager 116 and the provision manager 124 may then be configured to display the timer 604 within the user interface to the student computing devices 106 and the administrator computing device 104. For example, the administrator and students may be able to "see" the timer 604 within the virtual environment 126.

The administrator may apply the timer 604 to the virtual environment 126 for a predetermined amount of time. For example, when the timer 604 is "selected" from the timers menu 602 by the administrator, the input manager 118 and the provision manager 124 may be configured to display the timer 604 within the user interface to the student computing devices 106 and the administrator computing device 104 for a specified amount of time. The predetermined amount of time the timer 604 is displayed can be determined through various ways. In some embodiments, the input manager 118 and the provision manager 124 may be configured to determine the amount of time based on a user input by the administrator via the administrator computing device 104, as one example. As another example, the amount of time can be randomly determined by the central computing system 102. While the timer 604 depicted in the exemplary embodiment shown in FIG. 6 is generally in the shape of an hourglass, the timer 604 can be various other shapes, sizes, styles, or colors. For example, the timers menu 602 can include a plurality of various timer 604 choices for the administrator to choose from.

Figure 7:
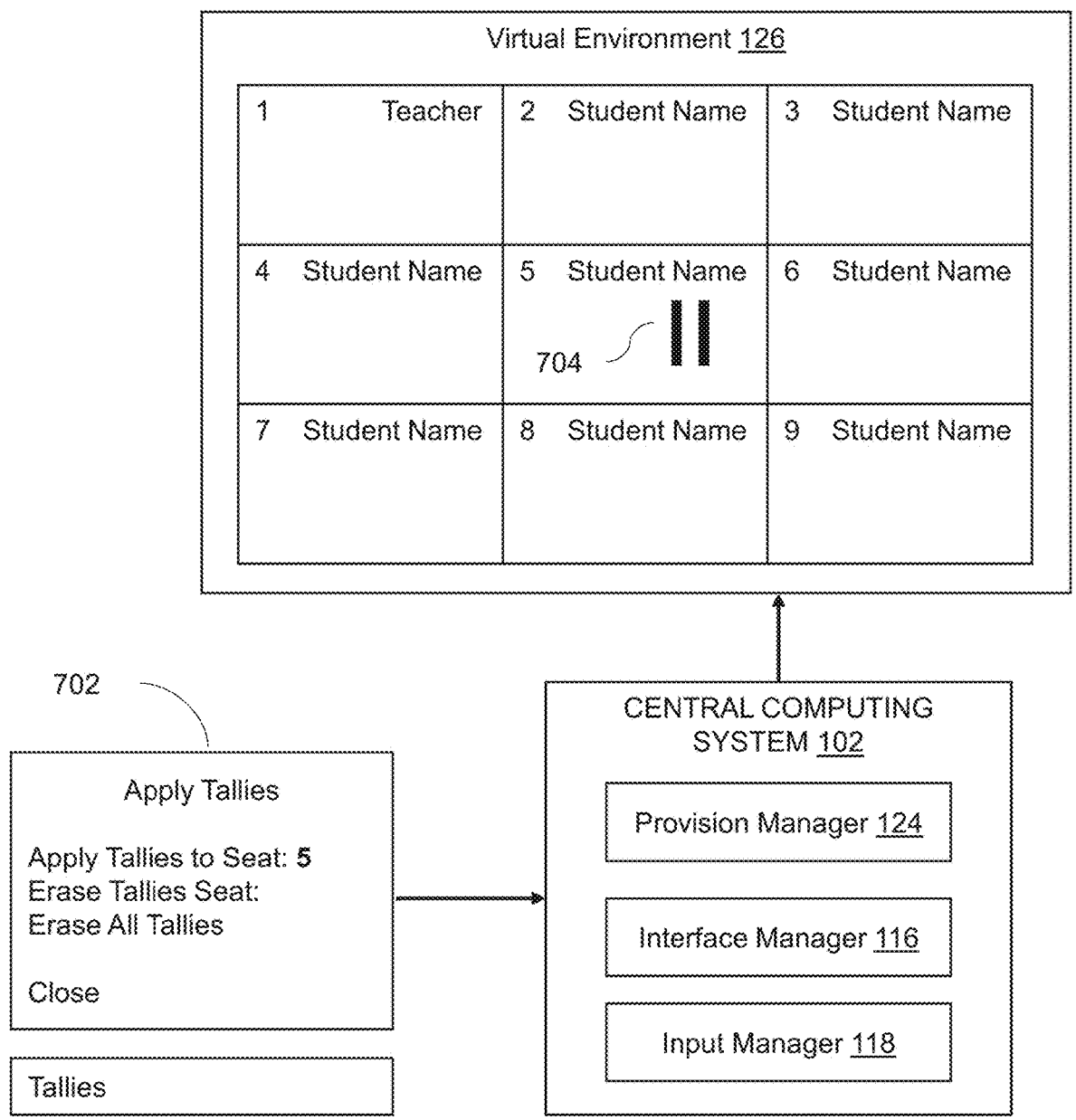

According to an exemplary embodiment referred to in FIG. 7, the administrator may input a subset of tallies 704 from a tallies menu 702 into the virtual environment 126. For example, the provision manager 124 may be configured to display the tallies menu 702 to the virtual environment 126 of the administrator computing device 104. The administrator may interact with the tallies menu 702 in various ways. For example, the administrator may "select" (e.g., touch, click, etc.) the tallies 704 from the tallies menu 702. The administrator may apply the tallies 704 to a specific student or to all students within the virtual environment 126, as another example. When the tallies 704 are "selected" from the tallies menu 702 by the administrator, the input manager 118 is configured to receive the feedback. The interface manager 116 and the provision manager 124 may then be configured to display the tallies 704 within the user interface to the student computing devices 106 and the administrator computing device 104. For example, the administrator and students may be able to "see" the tallies 704 within the virtual environment 126. According to the exemplary embodiment shown in FIG. 7, the tallies 704 displayed includes two individual tally marks. In other examples, the tallies 704 may include more or less tally marks (e.g., one, three, four, etc.)

The administrator may apply the tallies 704 to the virtual environment 126 for a predetermined amount of time. For example, when the tallies 704 is "selected" from the tallies menu 702 by the administrator, the input manager 118 and the provision manager 124 may be configured to display the tallies 704 within the user interface to the student computing devices 106 and the administrator computing device 104 for a specified amount of time. The predetermined amount of time the tallies 704 is displayed can be determined through various ways. In some embodiments, the input manager 118 and the provision manager 124 may be configured to determine the amount of time based on a user input by the administrator via the administrator computing device 104, as one example. As another example, the amount of time can be randomly determined by the central computing system 102. While the tallies 704 depicted in the exemplary embodiment shown in FIG. 7 are generally in the shape of tally markers, the tallies 704 can be other various shapes, sizes, or colors. For example. The tallies menu 702 can include a plurality of options of tallies 704 for the administrator to choose from.

Figure 8:
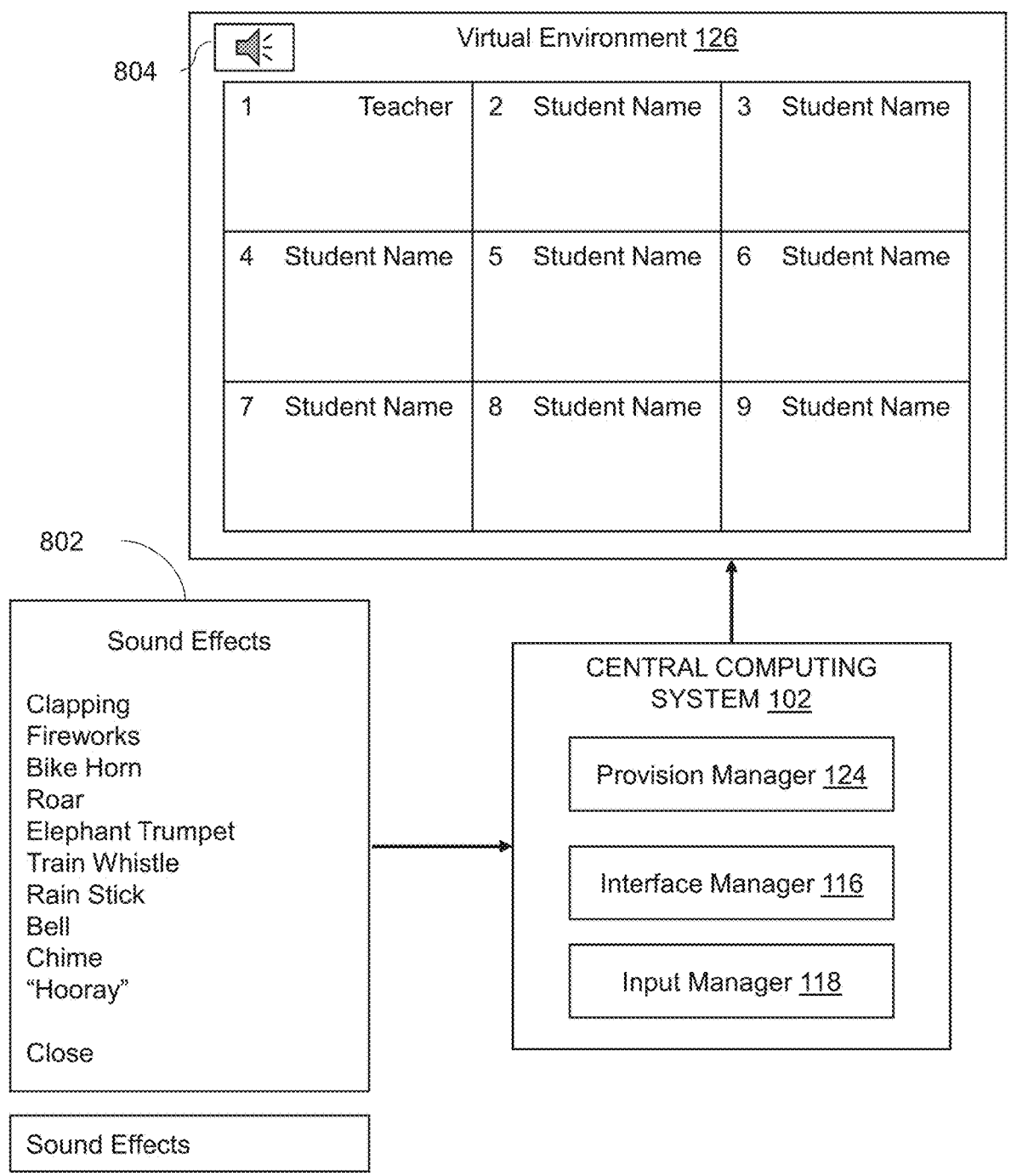

According to yet another exemplary embodiment referred to in FIG. 8, the administrator may input a sound effect 804 from a sound effects menu 802 into the virtual environment 126. For example, the provision manager 124 may be configured to display the sound effects menu 802 to the virtual environment 126 of the administrator computing device 104. The administrator may interact with the sound effects menu 802 in various ways. For example, the administrator may "select" (e.g., touch, click, etc.) the sound effect 804 from the sound effects menu 802. The administrator may apply the sound effect 804 to a specific student or to all students within the virtual environment 126, as another example. When the sound effect 804 is "selected" from the sound effects menu 802 by the administrator, the input manager 118 may be configured to receive the feedback. The interface manager 116 and the provision manager 124 may then be configured to render (e.g., provide audio) the sound effect 804 to the student computing devices 106 and the administrator computing device 104. For example, the administrator and students may be able hear the sound effect 804 via their respective devices 104, 106 while accessing the virtual environment 126.

The administrator may apply the sound effect 804 to the virtual environment 126 for a predetermined amount of time. For example, when the sound effect 804 is "selected" from the sound effects menu 802 by the administrator, the input manager 118 and the provision manager 124 may be configured to display the sound effect 804 within the user interface to the student computing devices 106 and the administrator computing device 104 for a specified amount of time. The predetermined amount of time the sound effect 804 is displayed can be determined through various ways. In some embodiments, the input manager 118 and the provision manager 124 may be configured to determine the amount of time based on a user input by the administrator via the administrator computing device 104, as one example. As another example, the amount of time can be randomly determined by the central computing system 102.

Referring now to FIG. 9-11, a user from a student computing device 106 may be grouped with other users from another student computing device 106 into a virtual breakout room. A virtual breakout room may be a virtual "meeting" for a smaller group of students than a traditional setting. For example, in traditional in-person room settings, an administrator may want to divide students into groups for discussion. A breakout room may provide means to facilitate such discussions virtually (e.g., divide users into subsections within the virtual environment 126). When the administrator selects to use a breakout room interface 902, the central computing system 102 may be configured to receive the instructions from the administrator computing device 104 and provide the breakout room interface 902 to the virtual environment 126. For example, the breakout room interface 902 may be provided to the virtual environment 126 through the provision manager 124. The administrator may control which students get placed into specific breakout rooms. The administrator may control placement or movement of students within each breakout room. For example, the central computing system 102 may be configured to receive instructions (e.g., seating chart, name list, etc.) for positioning certain students of the student computing devices 106 into a specific breakout room. The breakout room interface 902 may be used in various circumstances. For example, the central computing system 102 may be configured to provide the breakout room interface 902 at a predetermined time. The central computing system 102 may be configured to provide the breakout room interface 902 based off a user input, as another example.

When the breakout room interface 902 is being utilized, the administrator may be able to see and hear all of the users within the virtual breakout rooms even when not present within the breakout room. In some embodiments, the administrator may control visual and audio of each user within each breakout room. For example, the administrator computing device 104 may receive instructions from the administrator to provision a visual and/or audio representation (e.g., from a camera or microphone) of a student computing device 106 within a specific breakout room of the breakout room interface 902. The administrator computing device 104 may transmit data corresponding to the instructions to the central computing system 102. The central computing system 102 may then be configured to provision the specified breakout room to the virtual environment 126 of the administrator computing device 104. The administrator may be able to communicate with each of the breakout rooms simultaneously or individually. For example, audio data can be captured via a microphone of the administrator computing device 104. The audio data may be streamed, transmitted, or otherwise provided to the student computing devices 106. For instance, the audio data may be provided to each of the student computing devices 106 within each of the breakout rooms. The audio data may be provided to each of the student computing devices 106 of one of the breakout rooms, as another example. The audio data may be provided to one of the student computing devices 106 of one of the breakout rooms, as yet another example. Referring to the exemplary embodiment in FIG. 9, the teacher is present within breakout room 2 906 and may see users within breakout room 1 904 and breakout room 3 908.

Referring to FIG. 10, when the breakout room interface 902 is being utilized, students within a breakout room may be able to see the administrator at all times, even when the administrator is not present within the breakout room. Referring to the exemplary embodiment in FIG. 10, the users within breakout room 3 908 may see the administrator even though the administrator is not present within the breakout room.

Referring to FIG. 11, when the breakout room interface 902 is being utilized, the administrator has the option to join each of the breakout rooms. Referring to the exemplary embodiment in FIG. 11, the administrator is in breakout room 3 908. According to some exemplary embodiments, the administrator may control how long the breakout room interface 902 is used. In some embodiments, the input manager 118 and the provision manager 124 may be configured to determine the amount of time the breakout room interface 902 is provisioned based on a user input by the administrator via the administrator computing device 104, as one example. As another example, the amount of time can be randomly determined by the central computing system 102, as another example.

Users within a breakout room may be able to provide feedback. For example, a student within a breakout room may be able to provide visual and/or audio feedback (e.g., hand-raise, flashing light, flag, etc.) to the administrator or to other students within the breakout room. When a user provides feedback within a breakout room, the input manager 118 may be configured to receive the feedback. The interface manager 116 and the provision manager 124 may then be configured to display (e.g., provide visual and audio) the feedback within the breakout room interface 902 to the student computing devices 106 and the administrator computing device 104.

According to the exemplary embodiments in FIG. 9-11, the breakout room interface 902 includes three breakout rooms each including two students within the room. In other embodiments, the breakout room interface 902 includes more or less breakout rooms (e.g., two rooms, four rooms, etc.) and more students (e.g., three students, four students, etc.).

Referring now to FIG. 12, a user from a student computing device 106 may be placed into a virtual "waiting room" when the administrator utilizes a virtual waiting room interface 1202. For example, in an in-person setting, a teacher may have students wait outside of a classroom until the classroom is ready. Similarly, the virtual waiting room may be a virtual space (e.g., meeting) for students to wait to be accepted into a virtual classroom (e.g., meeting, conference, etc.) at the discretion of the administrator. Within the virtual waiting room interface 1202, students and/or the administrator may have the option to choose a screen saver 1204 from a screen saver menu 1206 and music 1208 from a music menu 1210. For example, the students and/or the administrator may "select" (e.g., touch, click, etc.) a screen saver 1204. The central computing system 102 may then be configured to receive the input from the students and/or administrator and display the "selected" screen saver 1204 to the student computing devices 106 and/or the administrator computing device 104. For example, when the administrator selects to use a virtual waiting room interface 1202, the central computing system 102 may receive the instructions and provide the virtual waiting room interface 1202, including an idle screen provided by the idle screen manager 120, to the virtual environment 126 through the provision manager 124. The selected screen saver 1204 and music 1208 may be visible and audible to the users within the waiting room. According to the exemplary embodiment in FIG. 12, three students are placed within the virtual waiting room and are provided four options to choose from for both screen saver and music. In other embodiments, more or less students are placed within the virtual environment 126 (e.g., two students, four students, etc.) and are provided with more or less options to choose from for both screen saver and music (e.g., three options, five options, etc.). In one embodiment, the students within the virtual waiting room may be able to "see" and "hear" one another. According to other embodiments, the students within the virtual waiting room may not be able to "see" or "hear" one another. For example, audio data may be captured by a microphone of a student computing device 106 within the virtual waiting room. The audio data may be streamed, transmitted, or otherwise provided to another student computing device 106 within the waiting room, as one example. The audio data may not be provided to another student computing device within the waiting room, as another example. Similarly, visual data may be captured by a camera of a student computing device 106 within the virtual waiting room. The visual data may be streamed, transmitted, or otherwise provided to another student computing device 106 within the waiting room, as one example. The visual data may not be provided to another student computing device 106, as another example. In some embodiments, one "selected" screen saver 1204 or music 1208 may be visible or audible to each student within the virtual waiting room. In other embodiments, a "selected" screen saver 1204 or music 1208 may be visible or audible to individual students within the virtual waiting room. For example, the administrator computing device 104 may receive instructions from the administrator to provision an individualized choice of a screen saver 1204 or music 1208 option to a student computing device 106 within the waiting room. The administrator computing device 104 may transmit data corresponding to the instructions to the central computing system 102. The central computing system 102 may then be configured to provision the specified screen saver 1204 or music 1207 to the virtual environment 126 of a student computing device 106 within the waiting room.

Figure 13:
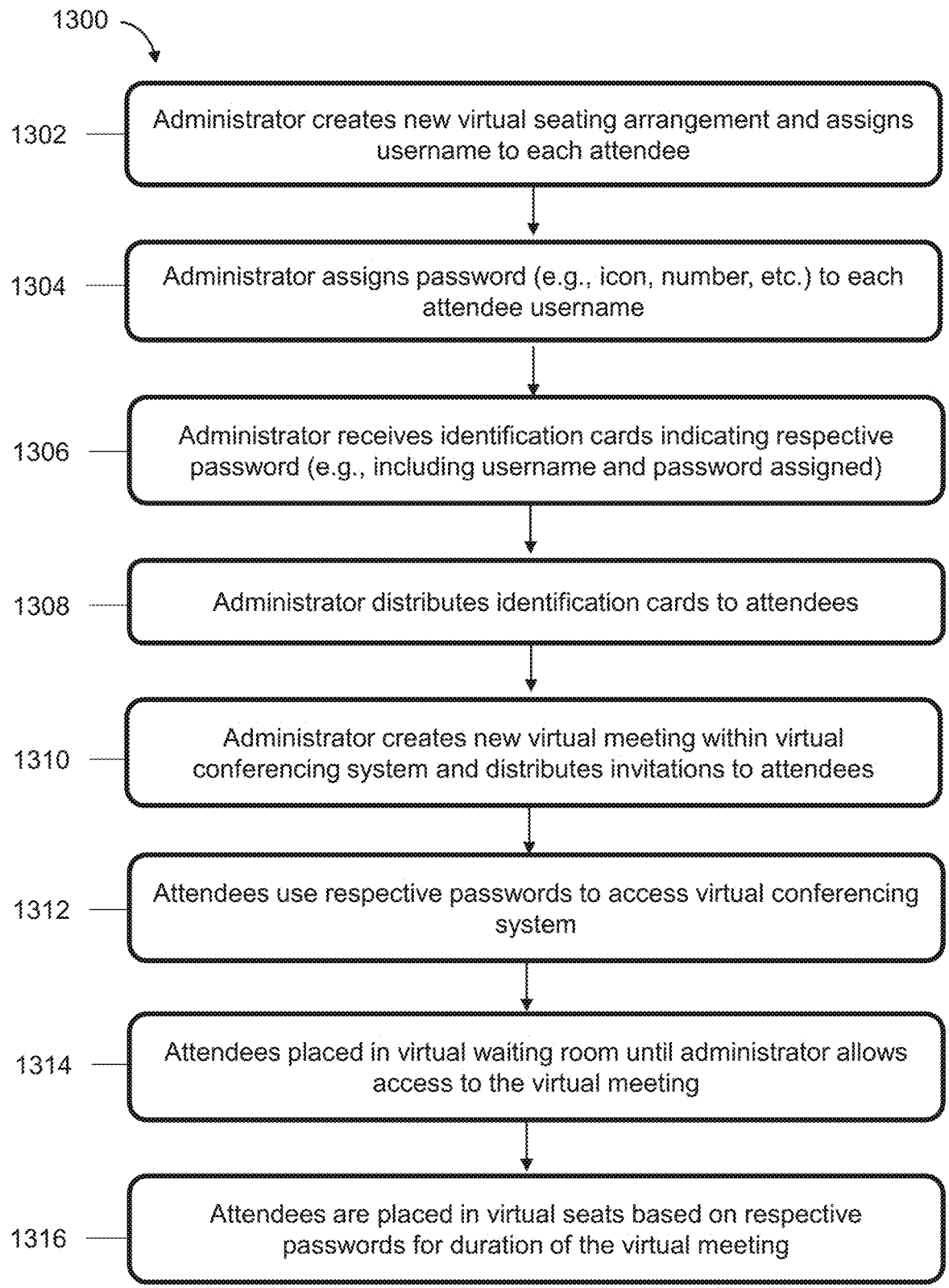
FIG. 13 is a flow diagram of a process of initiating a virtual conferencing system in accordance with the present disclosure.

Referring now to FIG. 13, depicted is a method 1300 of creating and implementing a virtual meeting with students, according to an illustrative embodiment. The steps of the method 1300 may be implemented or performed by one or more of the components described above, such as the central computing system 102, the administrator computing device 104, and/or the student computing devices 106.

As an overview, at step 1302, the administrator of the administrator computing device 104 creates a new virtual seating arrangement and assigns a username to each attendee of the student computing devices 106 through the central computing system 102. At step 1304, the administrator assigns a password to each username. At step 1306, the administrator receives identification cards from the central computing system 102 indicating respective attendee usernames and passwords. At step 1308, the administrator distributes the identification cards to attendees. At step 1310, the administrator creates a new virtual meeting within a virtual conferencing system through the central computing system 102 and invites attendees. At step 1312, the attendees access the virtual conferencing system through the provided passwords. At step 1314, the attendees are placed into a virtual waiting room until the administrator allows access to the meeting. At step 1316, the attendees are placed in virtual seats based on the respective passwords.

At step 1302, the administrator may create a new virtual seating chart arrangement. By way of example, the administrator may create a seating chart (e.g., map, layout, etc.) in which a specific "location" corresponds with a specific student. The administrator may then assign a username to each student. For example, one student may be assigned "seat one." Another student may be assigned "user 2," as another example. The administrator may input the seating chart into the central computing system 102. For example, the access manager 114 may be configured to receive the seating chart from the administrator computing device 104.

At step 1304, the administrator may assign a password (e.g., icon, number, etc.) to each student. For example, the administrator may assign a student to the password "X." The administrator may assign a student to the password "2," as another example. The administrator may input the password assignments to the central computing system 102. For example, the access manager 114 may be configured to receive the password assignments from the administrator computing device 104.

At step 1306, the administrator may receive identification cards indicating the respective passwords. For example, the central computing system 102 may be configured to create identification cards from the passwords assignments and provision the identification cards to the administrator computing device 104 such that the administrator may "see" the identification cards within the virtual environment 126 of the administrator computing device 104.

At step 1308, the administrator may distribute the identification cards indicating the respective password. For example, the central computing system 102 may be configured to provision the identification cards to the student computing devices 106 such that the users of the student computing devices 106 may "see" the identification card corresponding to a username within the virtual environment 126 of the respective student computing device 106.

At step 1310, the administrator may create a new virtual meeting and distribute an invitation to attendees. For example, the central computing system 102 may be configured to create a virtual meeting within a virtual conferencing system based on instructions from the administrator computing device 104. The central computing system 102 may then be configured to allow users to access the created virtual meeting through instructions form the administrator computing device 104 and the student computing devices 106.

At step 1312, the attendees may use the passwords from the respective identification cards to access the virtual conferencing system. For example, the central computing system 102 may be configured to receive a password from a user of a student computing device 106 and allow the user to "enter" the virtual meeting based on said password.

At step 1314, the attendees may be placed in a virtual waiting room until the administrator allows access to the virtual meeting. For example, the central computing system 102 may be configured to distribute a user of a student computing device 106 into the virtual waiting room. The central computing system 102 may be configured to then receive instructions from the administrator computing device 104 and allow the user of the student computing device 106 to access the virtual meeting.

At step 1316, the attendees are placed in virtual "seats" based on the respective password. For example, the central computing system 102 may be configured to direct a representation of a user of a student computing device 106 into a specific "location" of the virtual environment 126 based on the respective passwords of the identification cards.

Figure 14:
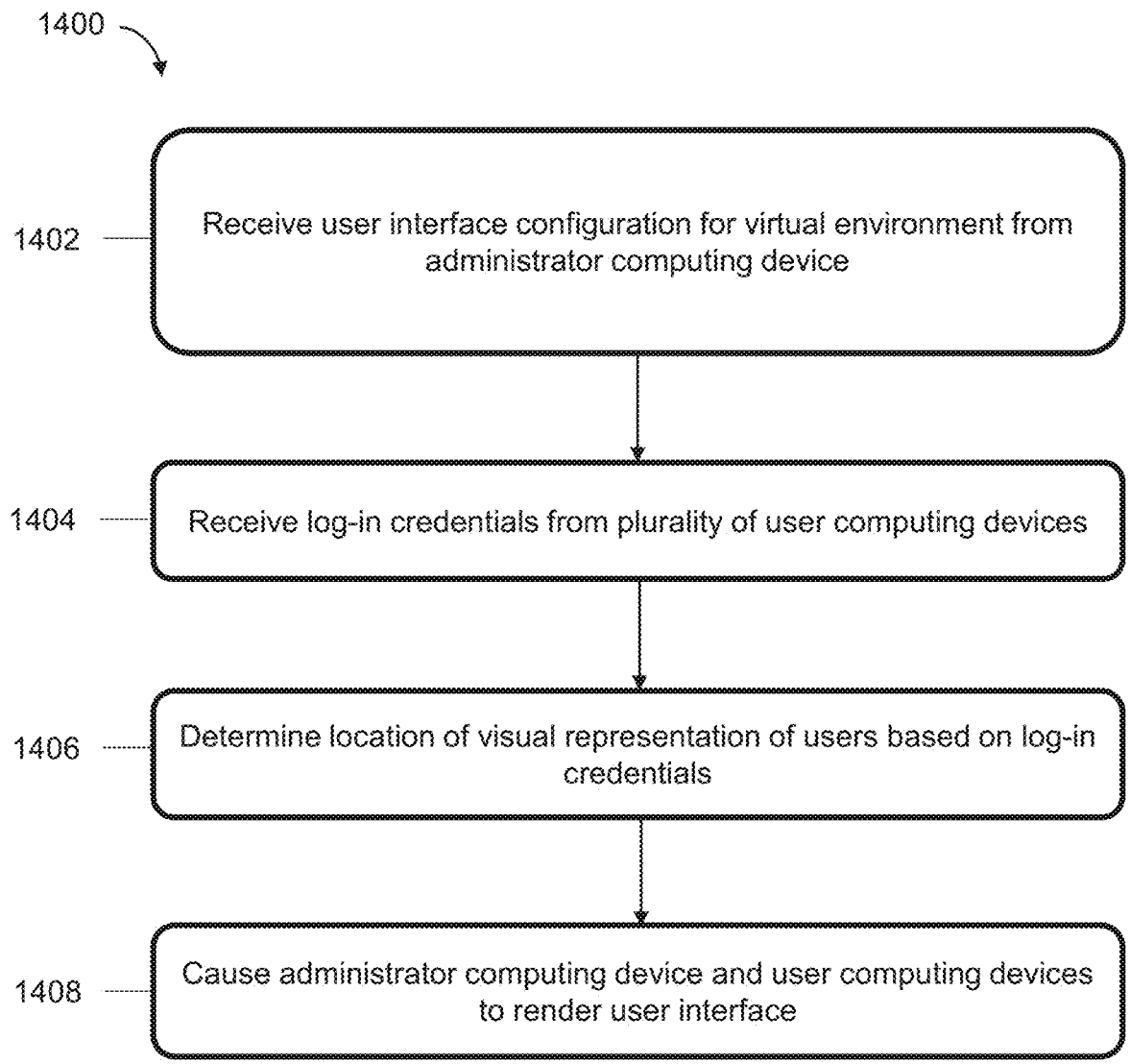
FIG. 14 is a flow diagram of a process of initiating and displaying a virtual environment and virtual seating chart in accordance with the present disclosure.

Referring now to FIG. 14, depicted is a method 1400 of creating and implementing a user interface, according to an illustrative embodiment. The steps of the method 1400 may be implemented or performed by one or more of the components described above, such as the central computing system 102, the administrator computing device 104, and/or the student computing devices 106.

As a brief overview, at step 1402, the central computing system 102 receives a user interface configuration for a virtual environment 126 from the administrator computing device 104. At step 1304, the central computing system 102 receives log-in credentials from a plurality of student computing devices 106. At step 1406, the central computing system 102 determines a location of visual representations of the users based on the log-in credentials. At step 1408, the central computing system 102 causes the administrator computing device 104 and the student computing devices 106 to render the user interface.

At step 1402, the central computing system 102 receives a user interface configuration for a virtual environment 126 from the administrator computing device 104 to be provided to the administrator computing device 104 and/or a plurality of student computing devices 106. The central computing system 102 may also receive a specified location for a visual representation of a user from a student computing device 106 to be displayed to the virtual environment 126. For example, the central computing system 102 may receive instructions from the administrator computing device 104 including an assigned credential (e.g., username, password, etc.) to each user of the student computing devices 106. Each credential may include a corresponding "location" within the virtual environment 126. In some embodiments, the visual representation of the user may be live stream from a camera of the student computing device 106. In other embodiments, the visual representation may be different (e.g., a picture, an icon, etc.).

At step 1404, the central computing system 102 receives log-in credentials from a plurality of student computing devices 106. For example, the central computing system 102 may receive the credentials (as depicted in step 1402) that correspond with a "location" within the virtual environment 126. In some embodiments, the log-in credentials may be numerical passwords. In other embodiments, the log-in credentials may be different (e.g., an icon, a letter, a phrase, etc.).

At step 1406, the central computing system 102 determines a location of visual representations of the users based on the log-in credentials. The central computing system 102 determines the location of the visual representation of the user from the user interface provided by the administrator computing device 104 and the corresponding log-in credentials received by the users of the plurality student computing devices 106. For example, the central computing system 102 may be configured to determine a location of a user of a student computing device 106 corresponding to a location provided by the administrator computing device 104 for each respective log-in credential assigned to a user.

At step 1408, the central computing system 102 causes the administrator computing device 104 and the student computing devices 106 to render the user interface, including the visual representation of the user. In some embodiments, the visual representation of the user may be a live stream (e.g., video and audio input) from a camera of the student computing device 106. In other embodiments, the visual representation may be different (e.g., a picture, an icon, etc.).

Figure 15:
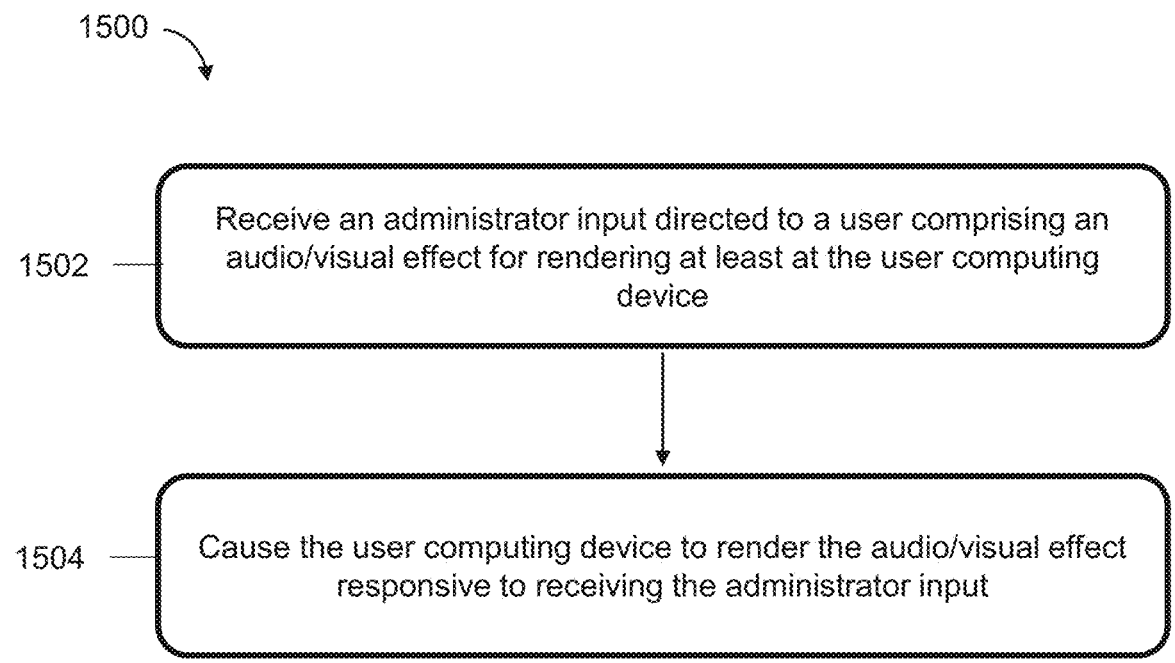
FIG. 15 is a flow diagram of a process of initiating and displaying user input into a virtual environment in accordance with the present disclosure.

Referring now to FIG. 15, depicted is a method 1500 of receiving and distributing a user input, according to an illustrative embodiment. The steps of the method 1500 may be implemented or performed by one or more of the components described above, such as the central computing system 102, the administrator computing device 104, and/or the student computing devices 106.

As a brief overview, at step 1502, the central computing system 102 receives an administrator input directed to a user of a student computing device 106. At step 1504, the central computing system 102 causes the administrator computing device 104 and the student computing devices 106 to render the input.

At step 1502, the central computing system 102 receives an administrator input directed to a user of the plurality of student computing devices 106. The central computing system 102 receives input from an administrator computing device 104 directed to a user. In some embodiments, the input may be directed to a specific user of the plurality of student computing devices 106. In other embodiments, the input may be directed to all users of the plurality of student computing devices 106. In some embodiments, the input may include and audio and visual effect. In other embodiments, the input may include only a visual effect. In some other embodiments, the input may include only an audio effect.

At step 1504, the central computing system 102 causes the student computing devices 106 to render the input. In some embodiments, the central computing system 102 may cause the student computing devices 106 to render the audio and visual effect in response to receiving the input from the administrator. In other embodiments, the central computing system 102 may cause the student computing devices 106 to render only a visual effect in response to receiving the input. In some other embodiments, the central computing system 102 may cause the student computing devices 106 to render only and audio effect in response to receiving the input.

Figure 16:
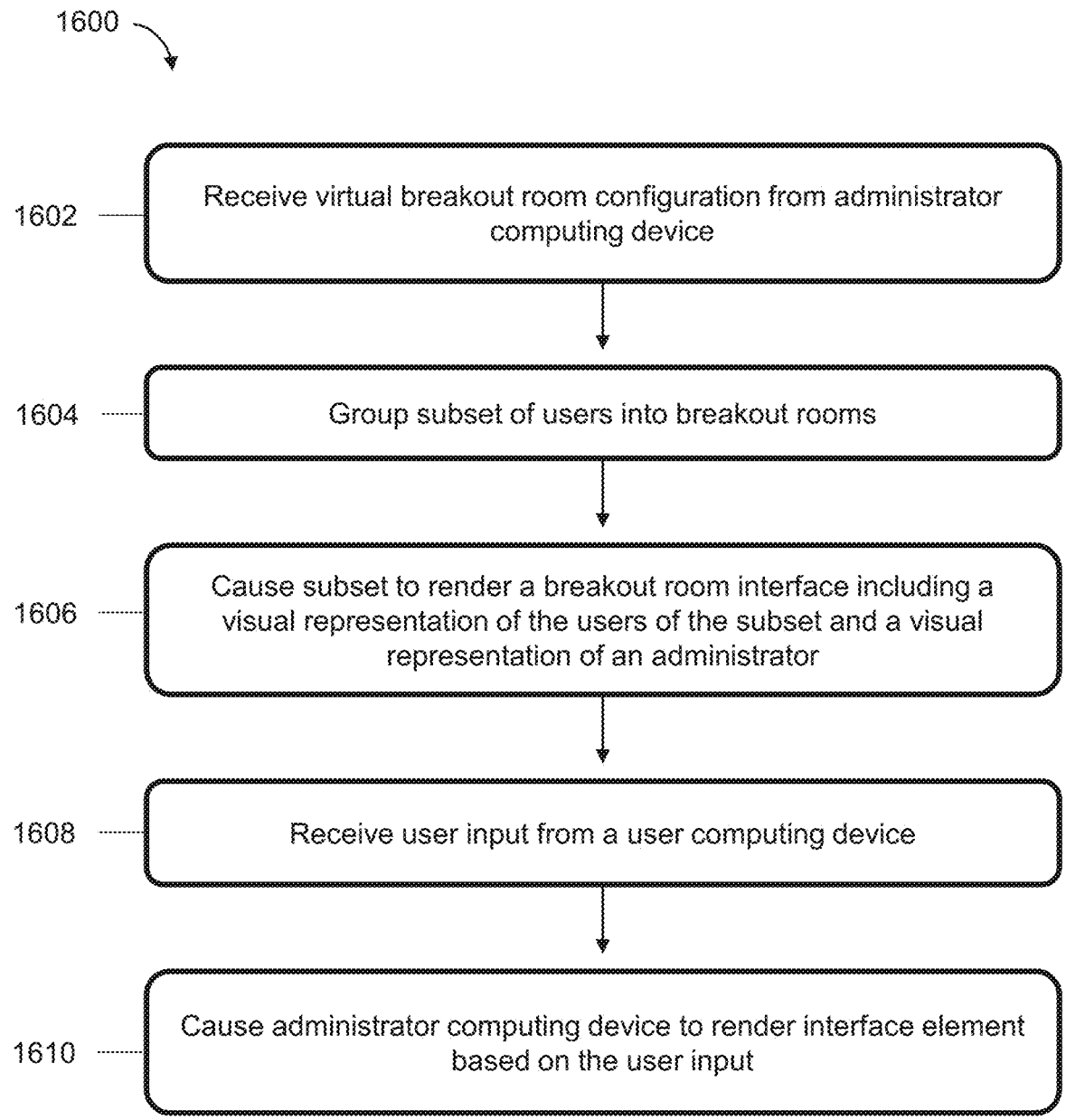
FIG. 16 is a flow diagram of a process of initiating and displaying a virtual breakout room interface in accordance with the present disclosure.

Referring now to FIG. 16, depicted is a method 1600 of implementing a breakout room interface 902, according to an illustrative embodiment. The steps of the method 1600 may be implemented or performed by one or more of the components described above, such as the central computing system 102, the administrator computing device 104, and/or the student computing devices 106.

As a brief overview, at step 1602, the central computing system 102 receives a virtual breakout room configuration from the administrator computing device 104. At step 1604, the central computing system 102 groups a subset of users of the plurality student computing devices 106 into breakout rooms. At step 1606, the central computing system 102 causes the subset of student computing devices 106 to render a breakout room interface 902. At step 1608, the central computing system 102 receives user input from a student computing device 106. At step 1610, the central computing system 102 causes the administrator computing device 104 to render an element (e.g., hand-raise, flag, etc.) based on the input.

At step 1602, the central computing system 102 receives a virtual breakout room configuration from the administrator computing device 104.

At step 1604, the central computing system 102 groups a subset of users into breakout rooms. In some embodiments, the central computing system 102 may group a subset of users of the plurality of student computing devices 106 into two breakout rooms. In other embodiments, the central computing system 102 may group a subset of users of the plurality of student computing devices 106 into more breakout rooms (e.g., three, four, five, etc.). In some embodiments, the subset of users may include two users. In other embodiments, the subset of users may include more users (e.g., three, four, five, etc.).

At step 1606, the central computing system 102 causes the subset of student computing devices 106 and the administrator computing device 104 to render the breakout room interface 902, including a visual representation of the users. The visual representation of the users include a visual representation of the administrator from the administrator computing device 104 and a visual representation of the subset of users within breakout rooms. In some embodiments, the visual representation of the user may be a live stream from a camera of the student computing device 106 or administrator computing device 104. In other embodiments, the visual representation may be different (e.g., a picture, an icon, etc.).

At step 1608, the central computing system 102 receives user input from a user of a student computing device 106. In some embodiments, the user input may include an audio and visual effect. In other embodiments, the user input may include only a visual effect. In some other embodiments, the user input may include only an audio effect.

At step 1610, the central computing system 102 causes the administrator computing device 104 to render the element (e.g., hand-raise, flag, etc.) based on the user input from the student computing device 106. In some embodiments, the user input may include an audio and visual effect. In other embodiments, the user input may include only a visual effect. In some other embodiments, the user input may include only an audio effect.

Figure 17:
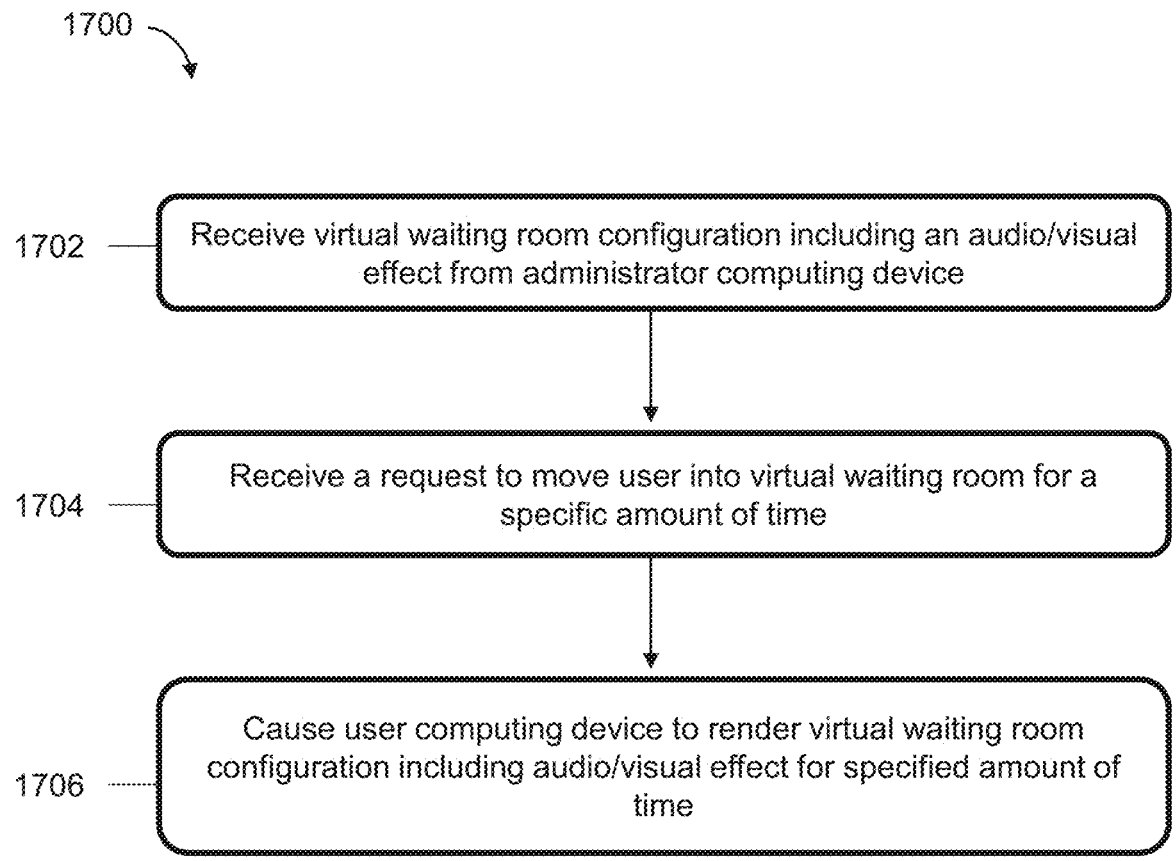
FIG. 17 is a flow diagram of a process of initiating and displaying virtual waiting room interface in accordance with the present disclosure.

Referring now to FIG. 17, depicted is a method 1700 of implementing a virtual waiting room interface 1202, according to an illustrative embodiment. The steps of the method 1700 may be implemented or performed by one or more of the components described above, such as the central computing system 102, the administrator computing device 104, and/or the student computing devices 106.

As a brief overview, at step 1702, the central computing system 102 receives a virtual waiting room configuration from the administrator computing device 104. At step 1704, the central computing system 102 receives a request to move a user into the virtual waiting room. At step 1706, the central computing system 102 causes the student computing device 106 to render the virtual waiting room configuration.

At step 1702, the central computing system 102 receives a virtual waiting room configuration from the administrator computing device 104. In some embodiments, the virtual waiting room may include an audio and visual effect. In other embodiments, the virtual waiting room may include only a visual effect. In some other embodiments, the virtual waiting room may include only an audio effect.

At step 1704, the central computing system 102 receives a request from the administrator computing device 104 to move a user into the virtual waiting room. In some embodiments, the central computing system 102 may receive a request to move a user into the virtual waiting room for a specific amount of time.

At step 1706, the central computing system 102 causes the requested student computing devices 106 to render the virtual waiting room configuration. In some embodiments, the central computing system 102 may receive a request to move one user into the virtual waiting room. In other embodiments, the central computing system 102 may receive a request to move more than one user (e.g., two, three, four, etc.) into the virtual waiting room. In some embodiments, the virtual waiting room may include an audio and visual effect. In other embodiments, the virtual waiting room may include only a visual effect. In some other embodiments, the virtual waiting room may include only an audio effect. In some embodiments, the central computing system 102 may receive a request to move a user into the virtual waiting room for a specific amount of time.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the log-in window 300 of the exemplary embodiment may be incorporated in the virtual waiting room interface 1202. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system, comprising:
a central computing system configured to provide a virtual environment to an administrator computing device and to a plurality of user computing devices that are each associated with a respective user, the central computing system having one or more processors and memory storing instructions which, when executed by the processors, cause the one or more processors to:
receive, from the administrator computing device, a user interface configuration including a location of a visual representation of each of the respective users within a user interface to be displayed at the administrator computing device and the plurality of user computing devices;

receive, from a user computing device of the plurality of user computing devices, log-in credentials for a user to access the virtual environment;

determine, based on the log-in credentials, the location of the visual representation of the user within the user interface as provided by the user interface configuration from the administrator computing device;

cause the administrator computing device and the plurality of user computing devices to render the user interface with the visual representation of the user at the location as provided by the user interface configuration;

receive, from the administrator computing device, an administrator input directed to the location of the visual representation of the user rendered on the user interface, wherein the administrator input comprises a selection of an audio or visual timer effect and a duration for rendering the audio or visual timer effect at the user computing device;

cause the user computing device to render, for the selected duration, the audio or visual timer effect selected via the administrator input at the location over the visual representation of the user rendered on the user interface responsive to receiving the administrator input;

receive, from the administrator computing device, a second administrator input comprising a selection indicating to render the audio or visual timer effect at the remaining user computing devices of the plurality of user computing devices;

cause each of the remaining user computing devices of the plurality of user computing devices to render, for the selected duration, the audio or visual timer effect selected via the administrator input at the location over the visual representation of the user rendered on the user interface responsive to receiving the second administrator input;

receive, from the administrator computing device, a breakout room configuration which groups the plurality of user computing devices into a plurality of virtual breakout rooms, each of the plurality of virtual breakout rooms comprising a subset of the plurality of user computing devices;

cause the subset of the plurality of user computing devices for the respective virtual breakout rooms to render a breakout room user interface, based on the breakout room configuration, which includes a visual representation of users of the subset of the computing devices and a visual representation of an administrator of the administrator computing device for a respective virtual breakout room of the plurality of virtual breakout rooms;

render the breakout room user interface for each of the plurality of virtual breakout rooms to the administrator computing device;

receive, from a user computing device within a first virtual breakout room of the plurality of virtual breakout rooms, a user input comprising a selection of a visual effect for rendering at the administrator computing device; and cause the administrator computing device to render the visual effect selected via the user input only at the location over the visual representation of the first breakout room rendered on the breakout room user interface responsive to receiving the user input.

2. The system of claim 1, wherein the visual representation comprises a live stream of the user received from a camera of the user computing device.

3. The system of claim 1, wherein the instructions further cause the one or more processors to:
receive a second user input from the user computing device; and
cause the administrator computing device to render a user interface element based on the second user input from the user computing device.

4. The system of claim 1, wherein the instructions further cause the one or more processors to receive, from the administrator computing device, a virtual waiting room configuration including an audio or visual effect for rendering at the user computing devices within a virtual waiting room.

5. The system of claim 4, wherein the instructions further cause the one or more processors to:
receive, from the administrator computing device, a request to move the user of the user computing device into the virtual waiting room, wherein the request specifies an amount of time in which the user is to be present in the virtual waiting room; and
cause the user computing device to render a virtual waiting room user interface based on the virtual waiting room configuration and including the audio or visual effect for the amount of time specified in the request.

6. The system of claim 1, wherein the audio or visual timer effect comprises a virtual hourglass.

7. A method comprising:
receiving, from an administrator computing device, a user interface configuration for a virtual environment provided to the administrator computing device and to a plurality of user computing devices, the user interface configuration including a location of a visual representation of each of the respective users within a user interface to be displayed at the administrator computing device and the plurality of user computing devices;

receiving, from a user computing device of the plurality of user computing devices, log-in credentials for a user to access the virtual environment;

determining, based on the log-in credentials, the location of the visual representation of the user within the user interface as provided by the user interface configuration from the administrator computing device;

causing the administrator computing device and the plurality of user computing devices to render the user interface with the visual representation of the user at the location as provided by the user interface configuration;

receiving, from the administrator computing device, an administrator input directed to the location of the visual representation of the user rendered on the user interface, wherein the administrator input comprises a selection of a visual timer effect and a duration for rendering the visual timer effect at the user computing device over the visual representation of the user;

causing the user computing device to render, for the selected duration, the visual timer effect selected via the administrator input at the location over the visual representation of the user rendered on the user interface responsive to receiving the administrator input;

receiving, from the administrator computing device, a second administrator input comprising a selection indicating to render the visual timer effect at the remaining user computing devices of the plurality of user computing devices;

causing each of the remaining user computing devices of the plurality of user computing devices to render, for the selected duration, the visual timer effect selected via the administrator input at the location over the visual representation of the user rendered on the user interface responsive to receiving the second administrator input;

receiving, from the administrator computing device, a breakout room configuration which groups the plurality of user computing devices into a plurality of virtual breakout rooms, each of the plurality of virtual breakout rooms comprising a subset of the plurality of user computing devices;

causing the subset of the plurality of user computing devices for the respective virtual breakout rooms to render a breakout room user interface, based on the breakout room configuration, which includes a visual representation of users of the subset of the computing devices and a visual representation of an administrator of the administrator computing device for a respective virtual breakout room of the plurality of virtual breakout rooms;

rendering the breakout room user interface for each of the plurality of virtual breakout rooms to the administrator computing device;

receiving, from a user computing device within a first virtual breakout room of the plurality of virtual breakout rooms, a user input comprising a selection of a visual effect for rendering at the administrator computing device; and causing the administrator computing device to render the visual effect selected via the user input only at the location over the visual representation of the first breakout room rendered on the breakout room user interface responsive to receiving the user input.

8. The method of claim 7, wherein the visual representation comprises a live stream of the user received from a camera of the user computing device.

9. The method of claim 7, further comprising:
receiving a second user input from the user computing device; and
causing the administrator computing device to render a user interface element based on the second user input from the user computing device.

10. The method of claim 7, further comprising receiving, from the administrator computing device, a virtual waiting room configuration including an audio or visual effect for rendering at the user computing devices within a virtual waiting room.

11. The method of claim 10, further comprising:
receiving, from the administrator computing device, a request to move the user of the user computing device into the virtual waiting room, wherein the request specifies an amount of time in which the user is to be present in the virtual waiting room; and
causing the user computing device to render a virtual waiting room user interface based on the virtual waiting room configuration and including the audio or visual effect for the amount of time specified in the request.

12. The method of claim 7, wherein the visual timer effect comprises a virtual hourglass.

13. A non-transitory computer readable medium storing instructions that, when executed by a processor, causes the processor to perform operations, the operations comprising:
receiving, from an administrator computing device, a user interface configuration for a virtual environment provided to the administrator computing device and to a plurality of user computing devices, the user interface configuration including a location of a visual representation of each of the respective users within a user interface to be displayed at the administrator computing device and the plurality of user computing devices;

receiving, from a user computing device of the plurality of user computing devices, log-in credentials for a user to access the virtual environment;

determining, based on the log-in credentials, the location of the visual representation of the user within the user interface as provided by the user interface configuration from the administrator computing device;

causing the administrator computing device and the plurality of user computing devices to render the user interface with the visual representation of the user at the location as provided by the user interface configuration;

receiving, from the administrator computing device, an administrator input directed to the location of the visual representation of the user rendered on the user interface, wherein the administrator input comprises a selection of a visual timer effect and a duration for rendering the visual timer effect at the user computing device;

causing the user computing device to render, for the selected duration, the visual timer effect selected via the administrator input at the location over the visual representation of the user rendered on the user interface responsive to receiving the administrator input;

receiving, from the administrator computing device, a second administrator input comprising a selection indicating to render the visual timer effect at the remaining user computing devices of the plurality of user computing devices;

causing each of the remaining user computing devices of the plurality of user computing devices to render, for the selected duration, the visual timer effect selected via the administrator input at the location over the visual representation of the user rendered on the user interface responsive to receiving the second administrator input;

receiving, from the administrator computing device, a breakout room configuration which groups the plurality of user computing devices into a plurality of virtual breakout rooms, each of the plurality of virtual breakout rooms comprising a subset of the plurality of user computing devices;

causing the subset of the plurality of user computing devices for the respective virtual breakout rooms to render a breakout room user interface, based on the breakout room configuration, which includes a visual representation of users of the subset of the computing devices and a visual representation of an administrator of the administrator computing device for a respective virtual breakout room of the plurality of virtual breakout rooms;

rendering the breakout room user interface for each of the plurality of virtual breakout rooms to the administrator computing device;

receiving, from a user computing device within a first virtual breakout room of the plurality of virtual breakout rooms, a user input comprising a selection of a visual effect for rendering at the administrator computing device; and causing the administrator computing device to render the visual effect selected via the user input only at the location over the visual representation of the first breakout room rendered on the breakout room user interface responsive to receiving the user input.

14. The non-transitory computer readable medium of claim 13, wherein the visual timer effect comprises a virtual hourglass.

\* \* \* \* \*